US009945984B2

(12) United States Patent
Hayashibe et al.

(10) Patent No.: US 9,945,984 B2
(45) Date of Patent: Apr. 17, 2018

(54) OPTICAL ELEMENT, OPTICAL SYSTEM, IMAGING APPARATUS, OPTICAL INSTRUMENT, AND STAMPER

(75) Inventors: Kazuya Hayashibe, Miyagi (JP); Yutaka Muramoto, Miyagi (JP); Hiroshi Tazawa, Miyagi (JP); Shunichi Kajiya, Miyagi (JP); Yu Nomura, Miyagi (JP); Sohmei Endoh, Miyagi (JP); Takashi Mabuchi, Aichi (JP)

(73) Assignee: SONY CORPORATION, Tokyo (JP)

( * ) Notice: Subject to any disclaimer, the term of this patent is extended or adjusted under 35 U.S.C. 154(b) by 1070 days.

(21) Appl. No.: 13/423,934

(22) Filed: Mar. 19, 2012

(65) Prior Publication Data
US 2012/0243097 A1 Sep. 27, 2012

(30) Foreign Application Priority Data

Mar. 23, 2011 (JP) .................................. 2011-064500

(51) Int. Cl.
*G02B 1/118* (2015.01)

(52) U.S. Cl.
CPC ............... *G02B 1/118* (2013.01); *Y10T 29/54* (2015.01)

(58) Field of Classification Search
CPC ..... G02B 1/118; G02B 5/1809; G02B 26/004
See application file for complete search history.

(56) References Cited

U.S. PATENT DOCUMENTS

| | | | |
|---|---|---|---|
| 2008/0055728 A1* | 3/2008 | Tanaka et al. | 359/584 |
| 2010/0271706 A1* | 10/2010 | Yamada et al. | 359/614 |
| 2011/0051249 A1* | 3/2011 | Endoh et al. | 359/599 |
| 2012/0160560 A1* | 6/2012 | Kajiya | B32B 3/30 |
| | | | 174/70 R |

FOREIGN PATENT DOCUMENTS

| | | | | |
|---|---|---|---|---|
| JP | 2003114316 A | * | 4/2003 | |
| JP | 2003215305 A | * | 7/2003 | |
| JP | 2004085831 A | * | 3/2004 | |
| JP | 2005109092 A | * | 4/2005 | |
| JP | 2008233849 A | * | 10/2008 | |
| JP | 2010097197 A | * | 4/2010 | |
| JP | 2011002853 | | 1/2011 | |
| JP | 2011028229 A | * | 2/2011 | |
| JP | 2011053495 A | * | 3/2011 | |
| JP | 2011053496 A | * | 3/2011 | |

(Continued)

OTHER PUBLICATIONS

Machine translation of JP 2004085831 A.*

(Continued)

*Primary Examiner* — Kimberly N Kakalec
(74) *Attorney, Agent, or Firm* — Chip Law Group

(57) ABSTRACT

An optical system includes an optical element and an imaging device. The optical element has a surface on which a plurality of sub-wavelength structure bodies are formed. The imaging device has an imaging region which senses light via the optical element. The surface of the optical element has one or two or more sections that scatter incident light and generate scattered light. A sum total of components of the scattered light reaching the imaging region is smaller than a sum total of components thereof reaching regions other than the imaging region.

21 Claims, 21 Drawing Sheets

(56) References Cited

FOREIGN PATENT DOCUMENTS

| JP | 2011232682 A | * | 11/2011 | |
|---|---|---|---|---|
| JP | 2012042665 A | * | 3/2012 | |
| JP | 2012086515 A | * | 5/2012 | |
| WO | WO 2007142186 A1 | * | 12/2007 | ............ G02B 1/118 |
| WO | WO 2007148718 A1 | * | 12/2007 | ............ G02B 1/118 |
| WO | WO 2009147858 A1 | * | 12/2009 | ............ G02B 1/118 |
| WO | WO 2011027909 A1 | * | 3/2011 | ............ B32B 3/30 |

OTHER PUBLICATIONS

Machine translation of JP 2008233849A.*
Machine translation of JP 2010097197A.*
Machine translation of JP 2011028229A.*
Machine translation of JP 2011053495A.*
Machine translation of JP 2011053496A.*
Machine translation of JP 2011232682A.*
Machine translation of JP 2012042665A.*
Machine translation of JP 2012086515A.*
Machine translation of JP 2003114316A.*
Machine translation of JP 2003215305A.*
Machine translation of JP 2005109092A.*
Dickensheets et al. (Nanostructured effective-index micro-optical devices based on blazed 2-D sub-wavelength gratings with uniform features on a variable-pitch, 2008 IEEE/LEOS International Conference on Optical MEMS and Nanophotonics, Aug. 11, 2008, pp. 54-55).*
European Patent Office, Extended European Search Report issued in connection with European Patent Application No. 12001767.8, dated Jun. 29, 2012. (7 pages).

\* cited by examiner

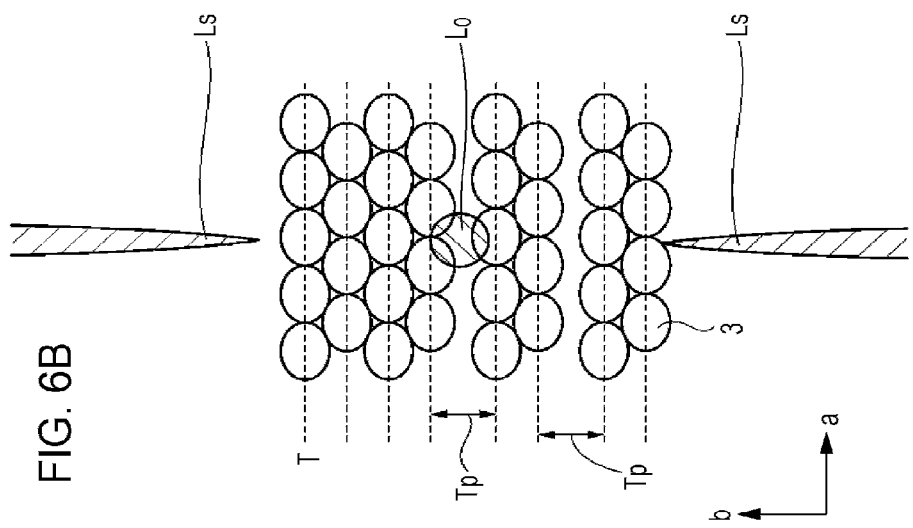
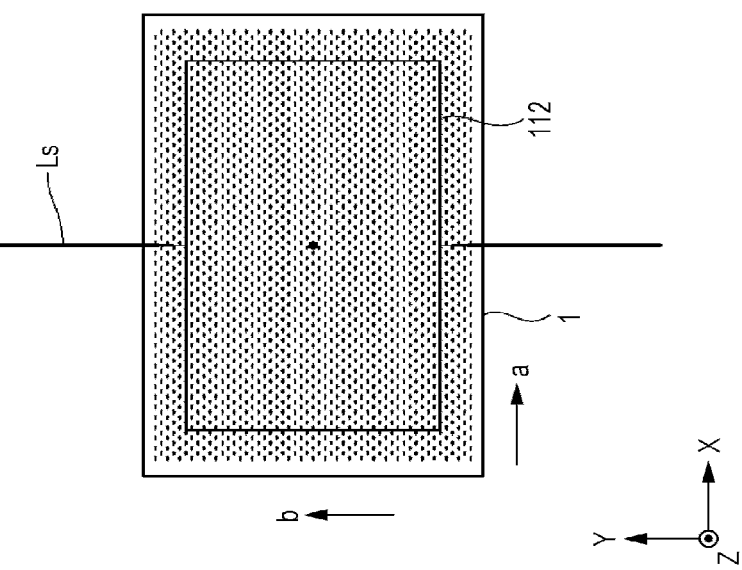

OPTICAL ELEMENT, OPTICAL SYSTEM, IMAGING APPARATUS, OPTICAL INSTRUMENT, AND STAMPER

CROSS REFERENCES TO RELATED APPLICATIONS

The present application claims priority to Japanese Priority Patent Application JP 2011-064500 filed in the Japan Patent Office on Mar. 23, 2011, the entire content of which is hereby incorporated by reference.

BACKGROUND

The present disclosure relates to an optical element, an optical system, an imaging apparatus, an optical instrument, and a stamper. Specifically, the present disclosure relates to an optical system including an optical element provided with a sub-wavelength structure body on a surface thereof.

In the related art, various techniques for suppressing surface reflection of light have been used in the technical field of the optical element. As one of the techniques, there is a technique where a sub-wavelength structure body is formed on an optical element surface (for example, refer to OPTICAL AND ELECTRO-OPTICAL ENGINEERING CONTACT, Vol. 43, No. 11 (2005), 630-637).

Generally, in a case where cyclic concave and convex shapes are provided on the optical element surface, diffraction occurs when light is transmitted therethrough, and the straightforward component of the transmitted light is considerably reduced. However, if the pitch of the concave and convex shapes is shorter than the wavelength of the transmitted light, the diffraction does not occur, and thus it is possible to achieve a good antireflection effect.

The above-described antireflection technique has an excellent antireflection characteristic, and thus an application thereof to various optical element surfaces has been reviewed. For example, there has been proposed a technique where a sub-wavelength structure body is formed on a lens surface (for example, refer to Japanese Unexamined Patent Application Publication No. 2011-002853).

SUMMARY

However, in a case where an optical element such as the lens provided with the sub-wavelength structure body on the surface thereof is used in an optical system of the imaging apparatus, if a light spot is photographed using the imaging apparatus, linear bright line noise occurs in the captured image.

It is desirable to provide an optical element, an optical system, an imaging apparatus, an optical instrument, and a stamper, capable of suppressing occurrence of linear bright line noise even in a case of photographing a light spot or the like.

According to an embodiment of the present disclosure, there is provided an optical system including an optical element that has a surface on which a plurality of sub-wavelength structure bodies are formed; and an imaging device that has an imaging region which senses light via the optical element, wherein the surface of the optical element has one or two or more sections that scatter incident light and generate scattered light, and wherein a sum total of components of the scattered light reaching the imaging region is smaller than a sum total of components thereof reaching regions other than the imaging region.

In the embodiment, since a sum total of components of the scattered light reaching the imaging region is smaller than a sum total of components thereof reaching regions other than the imaging region, it is possible to reduce the scattered light incident to the imaging device. Therefore, it is possible to suppress occurrence of linear bright line noise caused by the scattered light.

In the embodiment, an intensity distribution of the scattered light preferably has anisotropy. In this case, the intensity distribution of the scattered light is preferably different depending on numerical aperture NA, and, specifically, an intensity per unit solid angle of the intensity distribution of the scattered light is preferably smaller in a range of the numerical aperture NA≤0.8 than in the numerical aperture NA>0.8.

In the embodiment, a maximum value of intensity distribution of the scattered light in the imaging region is preferably smaller than a maximum value of intensity distribution of the scattered light in a region outside the imaging region.

In the embodiment, the plurality of sub-wavelength structure bodies are preferably arranged so as to form a plurality of lines on the surface of the optical element, and a pitch P of the lines is preferably varied as compared with a reference pitch P in the section. A shape of the line is preferably linear or an arc shape. In a case of employing such a shape of the line, the plurality of sub-wavelength structure bodies preferably form a grid pattern. The grid pattern is preferably at least one of a hexagonal grid pattern, a quasi-hexagonal grid pattern, a square pattern, and a quasi-square pattern.

In the embodiment, preferably, the imaging region has a rectangular shape having two sets of sides opposite to each other, and a direction of the lines is parallel to an extending direction of one set of sides of the two sets of sides. In this case, preferably, the two sets of sides include a set of short sides opposite to each other and a set of long sides opposite to each other, and the direction of the lines is parallel to an extending direction of the long sides. In addition, preferably, the sub-wavelength structure body is a cone which has a bottom surface of an elliptical shape having a long axis and a short axis, and a direction of the long axis of the bottom surface corresponds with the direction of the lines.

According to another embodiment, there is provided an optical element including a plurality of sub-wavelength structure bodies formed on a surface of the optical element, wherein the plurality of sub-wavelength structure bodies form a grid pattern, wherein the plurality of sub-wavelength structure bodies are disposed so as to form a plurality of lines of tracks on the surface, wherein the surface scatters a part of incident light, and wherein a sum of intensities of the scattered light is less than 1/500 of a sum of intensities of the incident light.

In the embodiment, since an intensity of the scattered light is less than 1/500 of intensity of the incident light, it is possible to suppress occurrence of the scattered light. Therefore, it is possible to suppress occurrence of bright line noise caused by the scattered light.

In the embodiment, a pitch Tp of the tracks is preferably varied between the tracks.

In the embodiment, the grid pattern is preferably at least one of a hexagonal grid pattern, a quasi-hexagonal grid pattern, a square pattern, and a quasi-square pattern.

In the embodiment, the optical element preferably has an incidence surface to which light is incident from a subject and an exit surface from which the light from the incidence surface is output, and the sub-wavelength structure bodies are preferably formed on at least one of the incidence surface and the exit surface.

The present disclosure is very suitable for application to an optical element having a surface on which sub-wavelength structure bodies are formed, an optical system having the optical element, or an imaging apparatus or an optical instrument having the optical element or the optical system. Examples of the optical element include a lens, a filter, a semi-transmissive mirror, a light control element, a prism, a polarization element, and the like, but are not limited thereto. Examples of the imaging apparatus include a digital camera, a digital video camera, and the like, but are not limited thereto. Examples of the optical instrument include a telescope, a microscope, an exposure device, a measurement device, an inspection device, an analysis instrument, and the like, but are not limited thereto.

According to the embodiments of the present disclosure, it is possible to suppress occurrence of linear bright line noise even in a case of photographing a light source such as a light spot.

Additional features and advantages are described herein, and will be apparent from the following Detailed Description and the figures.

BRIEF DESCRIPTION OF THE FIGURES

FIG. 6A is a schematic diagram when the imaging optical system shown in FIG. 5A is viewed from the side where the light is incident. FIG. 6B is an enlarged view of a part of the antireflection optical element of the imaging optical system shown in FIG. 6A.

DETAILED DESCRIPTION

Figure 1A:
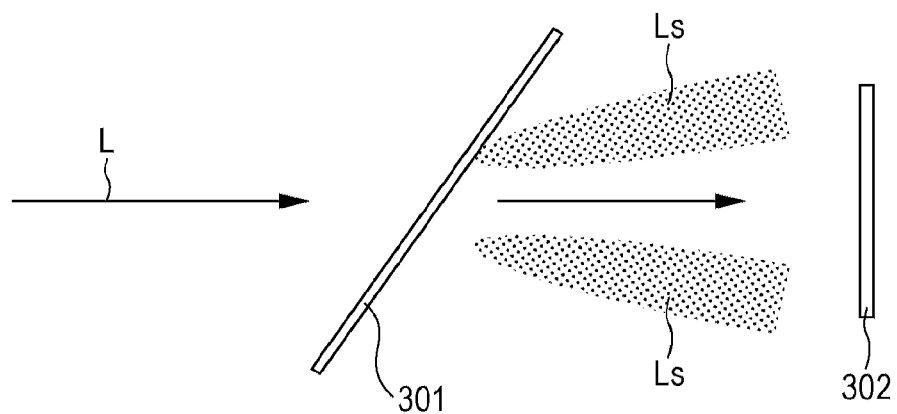
FIGS. 1A and 1B are schematic diagrams illustrating a cause of occurrence of bright line noise.

Embodiments of the present disclosure will be described with reference to the drawings. In all the drawings for illustrating the embodiments, identical or corresponding parts are given the same reference numerals.
1. FIRST EMBODIMENT (example of optical system which reduces scattered light reaching imaging region and imaging apparatus having the same)
2. SECOND EMBODIMENT (example where structure bodies are arranged in square grid shape or quasi-square grid shape)
3. THIRD EMBODIMENT (example where structure body has concave shape)
4. FOURTH EMBODIMENT (example where structure body is varied in inter-line direction)
5. FIFTH EMBODIMENT (example where structure body is in line direction)

6. SIXTH EMBODIMENT (example where structure body is applied to optical system of digital video camera)

1. First Embodiment

Outline of First Embodiment

The first embodiment has been devised as a result of the following examination.

The present inventors have keenly examined, as shown in FIG. 1A, an imaging optical system which includes a semi-transmissive mirror (optical element) 301 provided with sub-wavelength structure bodies on the incidence surface thereof and an imaging device 302 in order to suppress occurrence of linear bright line noise. As a result, when light L is incident to the semi-transmissive mirror 301 from a light source such as a light spot, scattered light Ls is generated, and the scattered light Ls which has been generated reaches an imaging region (light sensing region) of the imaging device 302. At this time, it has been found that whitish scattered light Ls is shown as the bright line noise in an image captured by the imaging device 302.

Figure 1B:
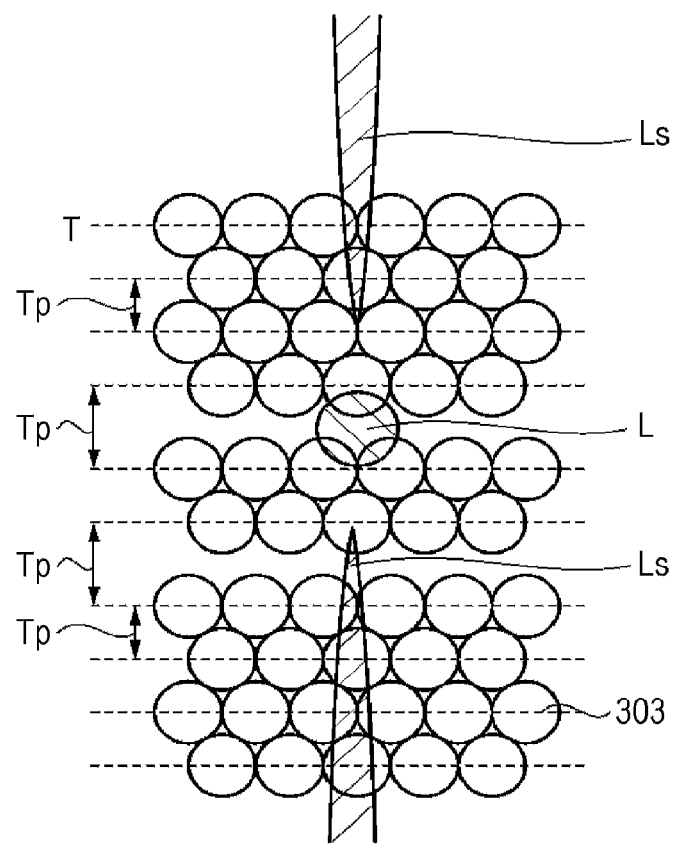

Therefore, the present inventors have keenly examined a cause of the occurrence of the scattered light Ls by the semi-transmissive mirror 301. As a result, it has been found that variations in the disposition pitches Tp of the sub-wavelength structure bodies are the cause of the occurrence of the scattered light Ls. In other words, in a case where a stamper is manufactured using a photolithography technique, as shown in FIG. 1B, the disposition pitch Tp of the sub-wavelength structure bodies 303 is varied due to an accuracy problem of the feed length when exposure is performed. If the disposition pitch Tp is varied in this way, there is an occurrence of sections where the disposition pitch Tp is larger than an ideal disposition pitch Tp. When the sections where the disposition pitch Tp is larger are irradiated with the light L from a light source such as a light spot, the scattered light Ls is generated.

Therefore, the present inventors have performed keen examination in order to suppress occurrence of the bright line noise in consideration of the above-described cause of the bright line noise. As a result, it has been found that the occurrence of the bright line noise can be suppressed by further reducing the component of the scattered light Ls reaching the imaging region as compared with the component of the scattered light Ls reaching regions other than the imaging region through adjustment of a shape or the like of the sub-wavelength structure body 303.

Configuration of Imaging Apparatus

Figure 2:
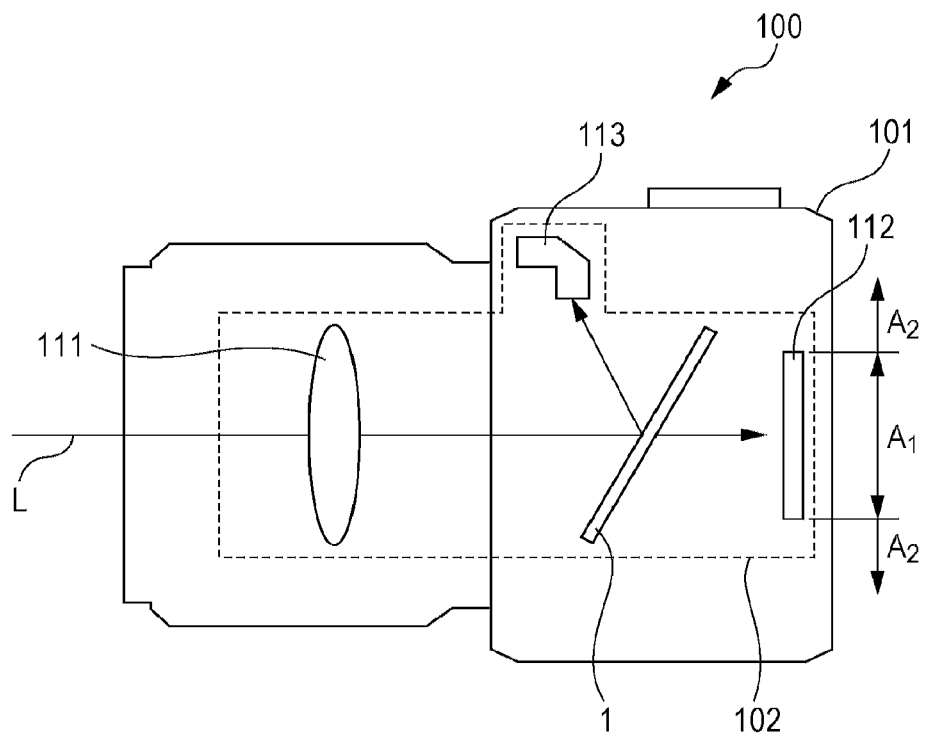
FIG. 2 is a schematic diagram illustrating an example of the configuration of the imaging apparatus according to a first embodiment of the present disclosure.

FIG. 2 is a schematic diagram illustrating an example of the configuration of the imaging apparatus according to the first embodiment of the present disclosure. As shown in FIG. 2, the imaging apparatus 100 according to the first embodiment is a so-called digital camera (digital still camera), and includes a case 101, and an imaging optical system 102 provided in the case 101. The imaging optical system 102 includes a lens 111, an antireflection optical element 1, an imaging device 112, and an automatic focus sensor 113.

The lens 111 collects the light L directed from a subject toward the imaging device 112. The antireflection optical element 1 reflects a part of the light L collected by the lens 111 toward the automatic focus sensor 113 and transmits the remainder of the light L toward the imaging device 112 therethrough. The imaging device 112 has a rectangular imaging region $A_1$ which senses the light transmitted through the antireflection optical element 1, converts the light sensed by the imaging region $A_1$ into an electric signal, and outputs the converted electric signal to a signal processing circuit. The automatic focus sensor 113 senses the light reflected by the antireflection optical element 1, converts the sensed light into an electric signal, and outputs the converted electric signal to a control circuit.

Antireflection Optical Element

Hereinafter, a configuration of the antireflection optical element 1 according to the first embodiment will be described in detail.

Figure 3A:
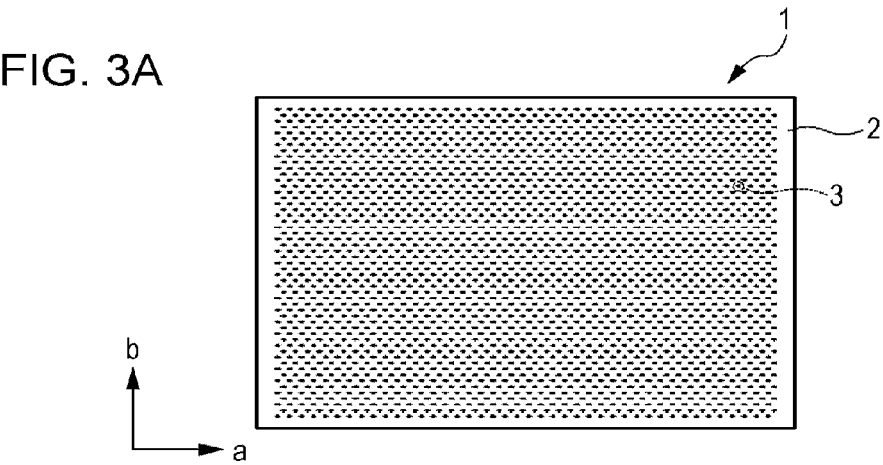
FIG. 3A is a plan view illustrating an example of the configuration of the antireflection optical element according to the first embodiment of the present disclosure.
Figure 3B:
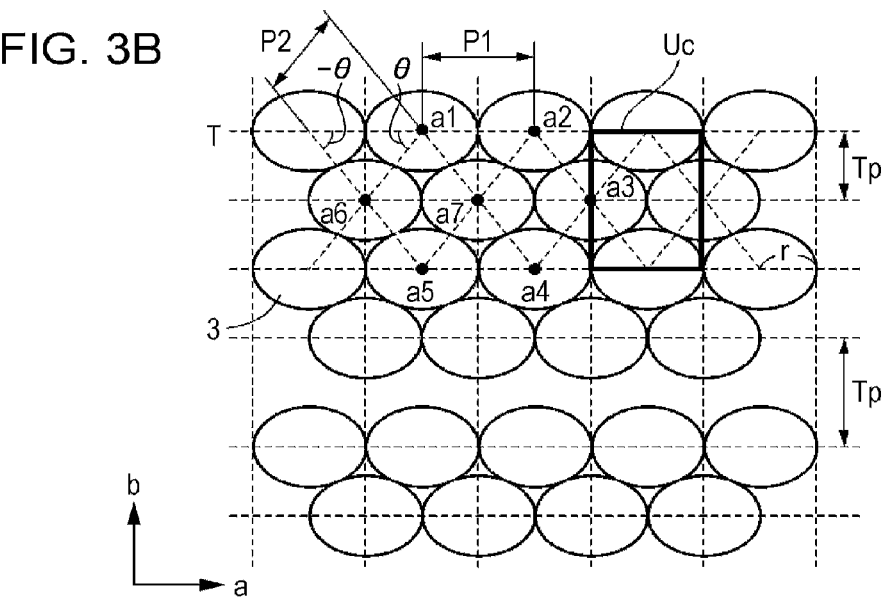
FIG. 3B is an enlarged plan view of a part of the antireflection optical element shown in FIG. 3A.
Figure 3C:
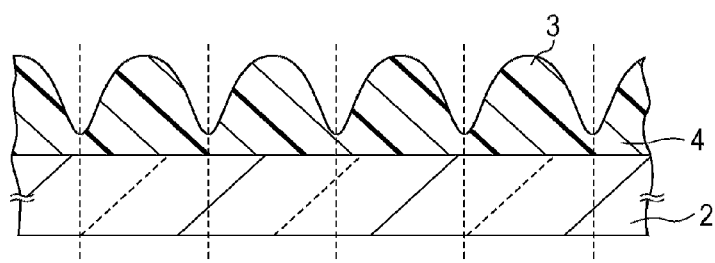
FIG. 3C is a cross-sectional view of the track of FIG. 3B.

FIG. 3A is a plan view illustrating an example of the configuration of the antireflection optical element according to the first embodiment of the present disclosure. FIG. 3B is an enlarged plan view of a part of the antireflection optical element shown in FIG. 3A. FIG. 3C is a cross-sectional view of the track T of FIG. 3B.

The antireflection optical element 1 includes a semi-transmissive mirror 2 having an incidence surface and an exit surface, and a plurality of structure bodies 3 formed on the incidence surface of the semi-transmissive mirror 2. The structure bodies 3 may be formed separately from or integrally with the semi-transmissive mirror 2. In a case where the structure bodies 3 are formed separately from the semi-transmissive mirror 2, a basal layer 4 may be provided between the structure bodies 3 and the semi-transmissive mirror 2. The basal layer 4 is integrally formed with the structure bodies 3 on the bottom side of the structure bodies 3, and is formed by curing an energy ray curable resin composition in the same manner as the structure bodies 3.

Hereinafter, the semi-transmissive mirror 2 and the structure bodies 3 provided in the antireflection optical element 1 will be described sequentially.

Semi-Transmissive Mirror

The semi-transmissive mirror 2 transmits a part of incident light therethrough and reflects the remainder thereof. A shape of the semi-transmissive mirror 2 includes, for example, a sheet shape and a plate shape, but is not particularly limited to such shapes. Here, a definition of the sheet includes a film.

Structure Body

The structure bodies 3 are so-called sub-wavelength structure bodies, have, for example, a convex shape with respect to the incidence surface of the semi-transmissive mirror 2, and are arranged on the incidence surface of the semi-transmissive mirror 2 in a two-dimensional manner. The structure bodies 3 are periodically arranged in a two-dimensional manner at a short disposition pitch equal to or less than a wavelength bandwidth of light for reducing reflection.

A plurality of structure bodies 3 have such a disposition shape that forms a plurality of lines of tracks T on the surface of the semi-transmissive mirror 2. Due to the problem when exposure is performed in the stamper creation process, a track pitch Tp of the tracks T is varied as shown in FIG. 3B. In the present disclosure, the track refers to a portion where the structure bodies 3 are connected so as to form a line. A shape of the track T may be a straight line shape, an arc shape, or the like, and the track T having such a shape may be wobbled. As such, the wobble of the track T can suppress apparent unevenness from occurring.

If the track T is wobbled, the wobbles for the respective tracks on the semi-transmissive mirror 2 are preferably synchronized with each other. That is to say, the wobbles are preferably synchronized wobbles. A unit grid shape such as a hexagonal grid or a quasi-hexagonal grid is maintained by synchronizing the wobbles with each other, and thus it is possible to maintain a filling rate to be high. A waveform of the wobbled track T includes, for example, a sine curve, a triangular wave, and the like. The waveform of the wobbled track T is not limited to the cyclic waveform but may be an acyclic waveform. The wobble amplitude of the wobbled track T is selected as, for example, about ±10 µm.

The surface of the semi-transmissive mirror 2 has one or two or more sections which scatter incident light from a light source such as a light spot so as to generate scattered light. In this section, for example, the track pitch Tp is varied relative to a track pitch Tp which is used as a reference, and is increased. Such a section is generated due to the problem when exposure is performed in the stamper creation process, and thereby it is difficult to suppress the generation of the section to an extent that the bright line noise is not generated or is not overly objectionable.

The structure bodies 3 are disposed at positions which are misaligned by a half pitch, for example, in the two adjacent tracks T. Specifically, in the two adjacent tracks T, the structure bodies 3 of one track (for example, T2) are disposed at intermediate positions (positions misaligned by a half pitch) of the structure bodies 3 arranged in the other track (for example, T1). As a result, as shown in FIG. 3B, in the three adjacent tracks T1 to T3, the structure bodies 3 are disposed so as to form a hexagonal grid pattern or a quasi-hexagonal grid pattern where the centers of the structure bodies 3 are located at the respective points a1 to a7. Hereinafter, a direction (extending direction of the track) where a line of the structure bodies extends is referred to as a track direction (line direction) a, and a direction perpendicular to the track direction a in the surface of the semi-transmissive mirror 2 is referred to as an inter-track direction (inter-line direction) b.

Here, the hexagonal grid refers to a grid with a regular hexagon shape. The quasi-hexagonal grid refers to a grid with a distorted regular hexagon shape. For example, in a case where the structure bodies 3 are disposed in a straight line shape, the quasi-hexagonal grid refers to a hexagonal grid which is distorted by stretching the grid with a regular hexagon shape in the arrangement direction (track direction) of the straight line shape. In a case where the structure bodies 3 are arranged so as to be wobbled, the quasi-hexagonal grid refers to a hexagonal grid obtained by distorting the grid with a regular hexagon shape through a wobble arrangement of the structure bodies 3, or a hexagonal grid which is distorted by stretching the grid with a regular hexagon shape in the arrangement direction (track direction) of the straight line shape and further obtained by distorting the grid with a regular hexagon shape through a wobble arrangement of the structure bodies 3.

In a case where the structure bodies 3 are disposed so as to form the quasi-hexagonal pattern, as shown in FIG. 3B, a disposition pitch P1 (for example, a distance between a1 and a2) of the structure bodies 3 in the same track is preferably longer than a disposition pitch of the structure bodies 3 between the two adjacent tracks, that is, a disposition pitch P2 (for example, a distance between a1 and a7, or a2 and a7) of the structure bodies 3 in a ±θ direction with respect to the track extending direction. If the structure bodies 3 are disposed in this way, it is possible to further improve the filing density of the structure bodies 3.

Detailed shapes of the structure body 3 include a pyramidal shape, a columnar shape, a needle shape, a hemisphere, a spherical semi-elliptical shape, a polygonal shape, and the like, but are not particularly limited thereto, and may have other shapes. Examples of the pyramidal shape include a pyramidal shape of which a top is sharpened or planarized, and a pyramidal shape of which a top has a convex curve or a concave curve, but are not limited to such shapes. The pyramidal shape of which a top has a convex shape includes a second-order curve shape such as a parabola. In addition, the pyramidal surface of the pyramidal shape may be bent in a concave or convex shape. If a roll stamper is manufactured using a roll stamper exposure device (refer to FIG. 8) described later, it is preferable that an elliptic cone shape of which a top has a convex shape or a circular truncated cone shape of which a top is planarized be employed as a shape of the structure body 3, and the long axis direction of the elliptical shape forming the bottom thereof correspond with the extending direction of the track T.

Figure 4A:
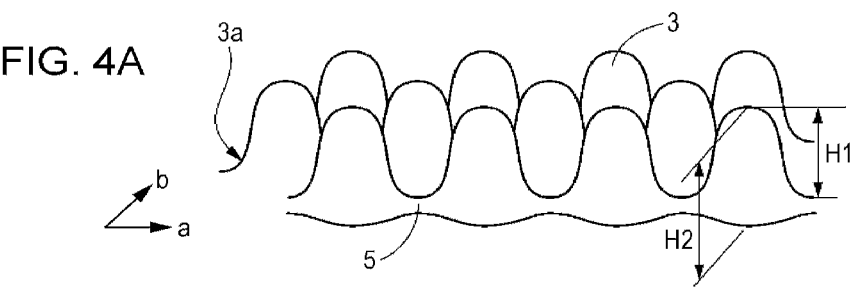
FIGS. 4A to 4D are perspective views illustrating shape examples of the laminate bodies of the antireflection optical elements.
Figure 4B:
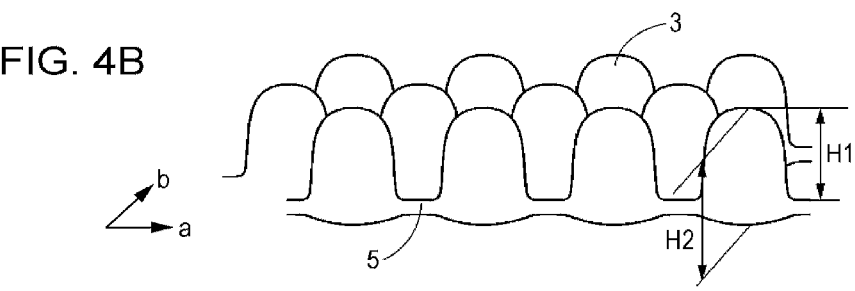
Figure 4C:
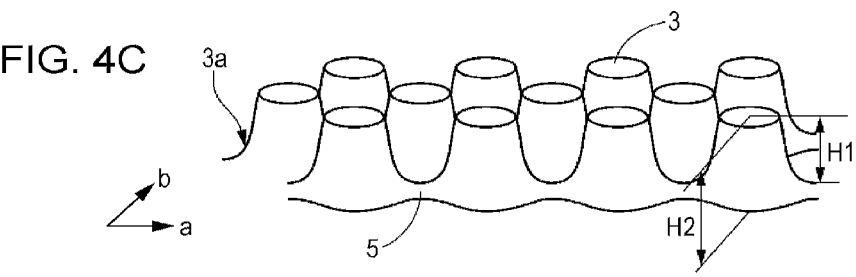

From the viewpoint of improvement in the reflection characteristic, as shown in FIG. 4A, a pyramidal shape where the slope is gentle at the top and is gradually steeper from the central part to the bottom, is preferable. In addition from the viewpoint of improvement in the reflection characteristic and transmittance characteristic, as shown in FIG. 4B, a pyramidal shape where the slope of the central part is steeper than that of the bottom and the top, or, as shown in FIG. 4C, a pyramidal shape of which the top is planarized is preferable. If the structure body 3 has an elliptic cone shape, or a circular truncated cone shape, the long axis direction of the bottom thereof is preferably parallel to the track extending direction.

The structure body 3, as shown in FIGS. 4A and 4C, preferably has a curved portion 3a of which the height is smoothly reduced from the top to the bottom at the circumference of the bottom. This is because the antireflection optical element 1 can be easily peeled off from a stamper or the like in the manufacturing process of the antireflection optical element 1. In addition, the curved portion 3a may be provided at a part of the circumference of the structure body 3, and is preferably provided at the entire circumference of the structure body 3 from the viewpoint of improvement in the peeling characteristic.

Figure 4D:
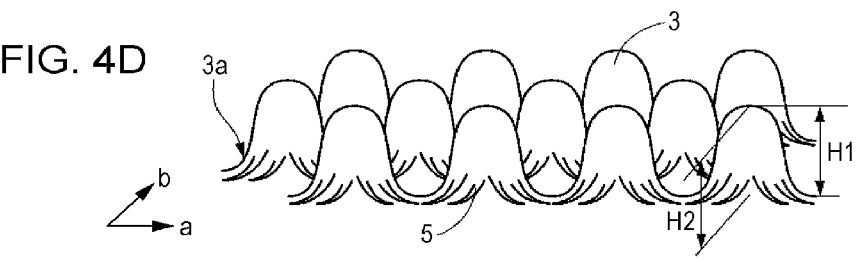

A protrusion 5 is preferably provided at a part of or the entire periphery of the structure body 3. This is because reflectance can be suppressed so as to have a low value in a case where the filling rate of the structure bodies 3 is low. From the viewpoint of easiness of formation, as shown in FIGS. 4A to 4C, the protrusion 5 is preferably provided between the adjacent structure bodies 3. In addition, as shown in FIG. 4D, the thin and long protrusions 5 may be provided at the entire periphery of the structure body 3 or a part thereof. The thin and long protrusions 5, for example, may extend from the top of the structure body 3 to the lower part, but are particularly not limited thereto. Shapes of the protrusion 5 may include a triangular shape in cross-section, a square shape in cross-section, and the like, but are not particularly limited to such shapes, and may be selected in consideration of easiness of formation. In addition, a part of or the entire surface of the periphery of the structure body 3 may be made to be rough, thereby forming fine concaves and convexes. Specifically, for example, a surface between the adjacent structure bodies 3 may be made to be rough, thereby forming fine concaves and convexes. In addition, micro holes may be formed on the surface of the structure body 3, for example, on the top.

In addition, in FIGS. 3A to 4D, the structure bodies 3 have the same size, the same shape, and the same height, but shapes of the structure bodies 3 are not limited thereto, and the structure bodies 3 having two or more kinds of sizes, shapes, and heights may be formed on the base surface.

The structure bodies 3 are regularly (periodically) disposed in a two-dimensional manner at a short pitch equal to or less than a wavelength bandwidth of, for example, light for reducing reflection. If a plurality of structure bodies 3 are arranged in a two-dimensional manner in this way, a two-dimensional wave front may be formed on the surface of the semi-transmissive mirror 2. Here, the disposition pitch indicates the disposition pitch P1 and the disposition pitch P2. The wavelength bandwidth of light for reducing reflection is, for example, a wavelength bandwidth of the ultraviolet light, a wavelength bandwidth of the visible light, or a wavelength bandwidth of the infrared light. Here, the wavelength bandwidth of the ultraviolet light is 10 nm to 360 nm, the wavelength bandwidth of the visible light is 360 nm to 830 nm, or the wavelength bandwidth of the infrared light is 830 nm to 1 mm. Specifically, the disposition pitch is preferably 175 nm or more to 350 nm or less. If the disposition pitch is less than 175 nm, the structure bodies 3 tend to be difficult to manufacture. On the other hand, if the disposition pitch exceeds 350 nm, diffraction of the visible light tends to occur.

The height H1 of the structure body 3 in the track extending direction is preferably smaller than the height H2 of the structure body 3 in the line direction. In other words, a relationship between the heights H1 and H2 of the structure body 3 preferably satisfies H1<H2. This is because if the structure bodies 3 are arranged so as to satisfy the relationship of H1≥H2, it is necessary to lengthen the disposition pitch P1 in the track extending direction, and thus the filling rate of the structure bodies 3 in the track extending direction is reduced. If the filling rate is reduced in this way, the reflection characteristic is deteriorated.

The height of the structure body 3 is not particularly limited and is appropriately set depending on a waveform region of transmitted light, and, for example, is set in a range of 236 nm or more to 450 nm or less, preferably, 415 nm or more to 421 nm or less.

An aspect ratio (height/disposition pitch) of the structure bodies 3 is set in a range of 0.81 or more to 1.46 or less, and, more preferably, in a range of 0.94 or more to 1.28 or less. This is because the reflection characteristic and the transmission characteristic tend to be deteriorated in a range less than 0.81, and a replica tends not to be clearly copied since the peeling characteristic is deteriorated when the structure bodies 3 are formed in a range exceeding 1.46. Further, from the viewpoint of further improvement in the reflection characteristic, the aspect ratio of the structure bodies 3 is preferably set in a range of 0.94 or more to 1.46 or less. In addition, from the viewpoint of further improvement in the reflection characteristic, the aspect ratio of the structure bodies 3 is preferably set in a range of 0.81 or more to 1.28 or less.

Here, the height distribution indicates that the structure bodies 3 having two or more kinds of heights are provided on the surface of the semi-transmissive mirror 2. For example, the structure bodies 3 having the reference height and the structure bodies 3 having heights different from the reference height of the structure bodies 3 may be provided on the surface of the semi-transmissive mirror 2. In this case, the structure bodies 3 having the heights different from the reference height are periodically or non-periodically (randomly) are provided on, for example, the surface of the semi-transmissive mirror 2. The periodical direction may include, for example, the track extending direction, the line direction, and the like.

In addition, in the present disclosure, the aspect ratio is defined by the following expression (1).

$$\text{Aspect ratio} = H/P \quad (1)$$

where H denotes a height of a structure body, and P denotes an average disposition pitch (average period)

Here, the average disposition pitch P is defined by the following expression (2).

$$\text{Average disposition pitch } P = (P1+P2+P2)/3 \quad (2)$$

where P1 denotes a disposition pitch in the track extending direction (track extending direction period), and P2 denotes a disposition pitch (θ direction period) in a ±θ direction (where θ=60°−δ where δ is preferably 0°<δ≤11°, and, more preferably, 3°≤δ≤6°) in the track extending direction.

In addition, the height H of the structure body 3 is the height of the structure body 3 in the line direction. Since the height of the structure body 3 in the track extending direction (X direction) is smaller than the height in the line direction (Y direction), and the height of the structure body 3 in parts other than the track extending direction is nearly the same as the height in the line direction, the height in the line direction represents the height of the sub-wavelength structure body. However, if the structure body 3 is a concave, the height H of the structure body 3 in the above-described expression (1) is replaced with the depth H of the structure body.

If a disposition pitch of the structure bodies 3 in the same track is P1, and a disposition pitch of the structure bodies 3 between the two adjacent tracks is P2, a ratio P1/P2 preferably satisfies a relationship of 1.00≤P1/P2≤1.1 or 1.00<P1/P2≤1.1. In the numerical value range, it is possible to increase the filling rate of the structure bodies 3 having the elliptic cone shape or the circular truncated cone shape, and thus the antireflection characteristic can be improved.

The filling rate of the structure bodies 3 on the base surface is 65% or more, preferably 73% or more, more preferably 86% or more, as the upper limit of 100%. In the filling rate of this range, it is possible to improve the antireflection characteristic. In order to increase the filling rate, it is preferable that the lower parts of the adjacent structure bodies 3 be joined to each other or overlap each other, or distortion be given to the structure bodies 3 through adjustment of ellipticity of the structure body lower surface.

Here, the filling rate (average filling rate) of the structure bodies 3 is a value obtained as follows.

First, a surface of the antireflection optical element 1 is photographed in top view using a scanning electron microscope (SEM). Next, a unit grid Uc is randomly selected from the captured SEM picture, and a disposition pitch P1 and a track pitch Tp of the unit grid Uc are measured (refer to FIG. 3B). In addition, the area S of the bottom surface of the structure body 3 located at the center of the unit grid Uc is measured through an image process. Next, the filling rate is obtained from the following expression (3) using the measured disposition pitch P1, track pitch Tp, and bottom surface area S.

Filling rate=(S(hex.)/S(unit))×100

Unit grid area: S(unit)=P1×2Tp

Area of bottom surface of structure bodies located in
the unit grid: S(hex.)=2S     (3)

The above-described filling rate calculation process is performed for ten unit grids which are randomly selected from the captured SEM picture. In addition, an average of the filling rates is obtained by simply averaging (arithmetically averaging) measured values, and is used as a filling rate of the structure bodies 3 on the base surface.

A filling rate when the structure bodies 3 overlap each other or sub-structure bodies such as the protrusions 5 are present between the structure bodies 3 can be obtained through a method of determining an area ratio using a portion corresponding to the height of 5% with respect to the height of the structure body 3 as a threshold value.

The structure bodies 3 are preferably connected to each other such that the lower parts thereof overlap each other. Specifically, a portion or all of the lower parts of the adjacent structure bodies 3 preferably overlap each other, and preferably overlap each other in the track direction, the θ direction, or in both the directions. The lower parts of the structure bodies 3 overlap each other in this way, and thereby the filling rate of the structure bodies 3 can be increased. The structure bodies preferably overlap each other at a part equal to or less than ¼ of the maximum value of the wavelength bandwidth of light in use circumstances in a light path considering the refractive index. This is because a good antireflection characteristic can be obtained.

The ratio of the diameter 2r to the disposition pitch P1 ((2r/P1)×100) is 85% or more, preferably, 90% or more, and more preferably 95% or more. This is because, in this range, the filling rate of the structure bodies 3 is increased, and thus it is possible to improve the antireflection characteristic. If the ratio ((2r/P1)×100) is increased and thus the overlapping of the structure bodies 3 is too increased, the antireflection characteristic tends to be deteriorated. Therefore, an upper limit value of the ratio ((2r/P1)×100) is preferably defined such that the structure bodies are preferably joined to each other at a part equal to or less than ¼ of the maximum value of the wavelength bandwidth of light in use circumstances in a light path considering the refractive index. Here, the disposition pitch P1 is a disposition pitch in the track direction of the structure bodies 3 as shown in FIG. 3B, and the diameter 2r is a diameter of the bottom surface of the structure body in the track direction as shown in FIG. 3B. In addition, if the structure body bottom surface is circular, the diameter 2r is a diameter, and if the structure body bottom surface is elliptical, the diameter 2r is a major axis.

Imaging Optical System

Figure 5A:
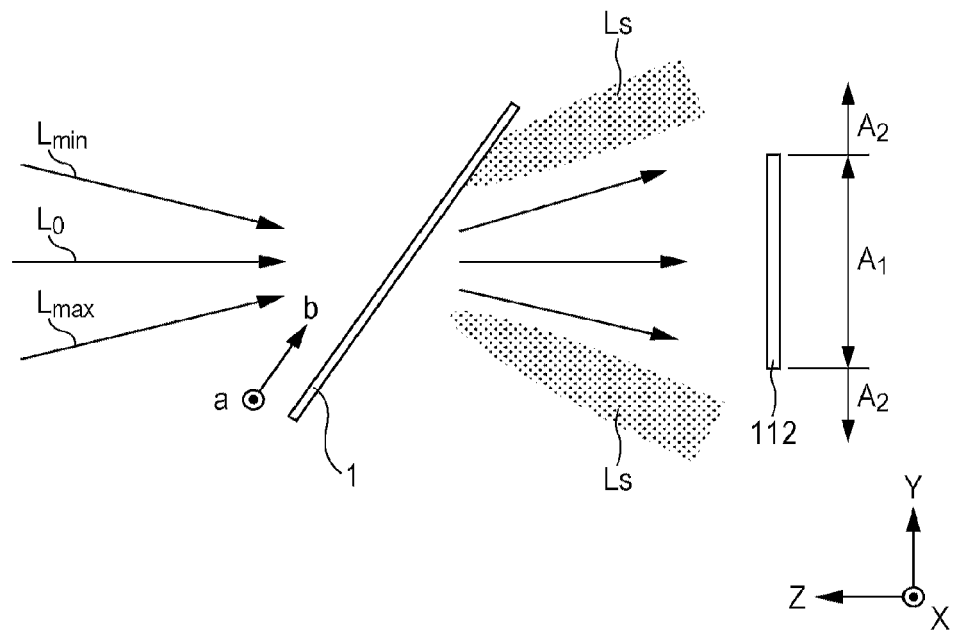
FIG. 5A is a schematic diagram illustrating by enlargement a part of the imaging optical system shown in FIG. 2.

FIG. 5A is a schematic diagram illustrating by enlargement a part of the image optical system shown in FIG. 2. FIG. 6A is a schematic diagram when the imaging optical system shown in FIG. 5A is viewed from the side to which the light beam $L_0$ is incident. FIG. 6B is an enlarged view of a part of the antireflection optical element provided in the imaging optical system shown in FIG. 6A. In FIG. 5A, the light beam $L_0$ indicates a main light beam from a subject, the light beam $L_{min}$ indicates a light beam having the smallest incidence angle to the antireflection optical element 1, and the light beam $L_{max}$ indicates a light beam having the largest incidence angle to the antireflection optical element 1. In addition, a direction parallel to the long side of the rectangular imaging region $A_1$ is defined as an X axis direction, and a direction parallel to the short side thereof is defined as a Y axis direction. Further, a direction perpendicular to the imaging surface of the imaging device 112 is defined as a Z axis direction.

The incidence surface of the antireflection optical element 1 has one or two or more sections which scatter incident light so as to generate scattered light Ls. A sum total of components of the scattered light Ls reaching the imaging region $A_1$ is preferably smaller than that of components reaching the region $A_2$ outside the imaging region. Thereby, it is possible to suppress the bright line noise from occurring in a captured image.

From the viewpoint of suppressing occurrence of the bright line noise, the maximum value of intensity distribution of the scattered light Ls in the imaging region $A_1$ is preferably smaller than the maximum value of intensity distribution of the scattered light Ls in the region $A_2$ outside the imaging region $A_1$.

The scattered light Ls is hardly spread in the X axis direction and reaches the plane including the imaging surface of the imaging device 112 as shown in FIG. 5A. Therefore, the intensity distribution of the scattered light Ls is varied mainly only in the Y axis direction. In other words, the intensity distribution of the scattered light Ls is different in the X axis direction and Y axis direction, and thus has anisotropy. In the present specification, the intensity distribution means intensity distribution in the Y axis direction.

A ratio (Ib/Ia) of a sum Ib of the intensities of the scattered light beams Ls which are scattered by the surface of the antireflection optical element 1 to a sum Ia of intensities of incident light beams which are incident to the surface of the antireflection optical element 1 is in a range preferably less than 1/500, more preferably equal to or less than 1/5000, and most preferably, equal to or less than $1/10^5$. If the ratio (Ib/Ia) is less than 1/500, it is possible to suppress occurrence of the linear bright line noise.

Figure 5B:
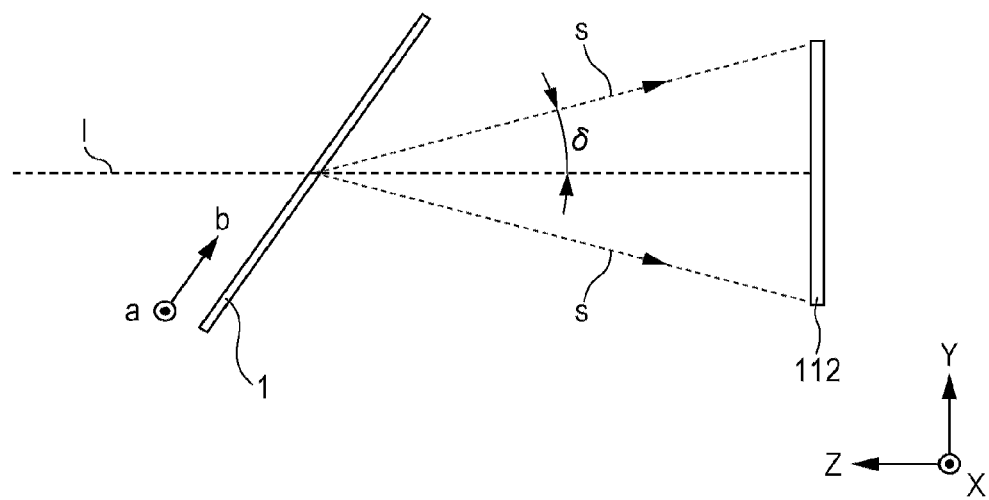
FIG. 5B is a schematic diagram illustrating the definition of the numerical aperture of the imaging optical system shown in FIG. 5A.

FIG. 5B is a schematic diagram illustrating the definition of the numerical aperture NA of the imaging optical system shown in FIG. 5A. Here, as shown in FIG. 5B, an optical axis of the antireflection optical element 1 and the imaging device 112 is defined as an optical axis 1, a direction of the scattered light Ls which is scattered by the incidence surface of the antireflection optical element 1 is defined as a scattering direction s, an angle formed by the optical axis 1 and the direction of the scattered light Ls is defined as an angle δ, and the numerical aperture NA is defined as n sin δ (where n is a refractive index of a medium (for example, air) between the antireflection optical element 1 and the imaging device 112).

The intensity distribution of the scattered light Ls having the anisotropy becomes different depending on the numerical aperture NA. In this case, an intensity per unit solid angle of the intensity distribution of the scattered light is preferably smaller in a range of the numerical aperture NA≤0.8 than in the numerical aperture NA>0.8. This is because a light amount of the scattered light Ls reaching the imaging region $A_1$ of the imaging device 112 can be reduced.

As shown in FIG. 6A, the imaging region $A_1$ has, for example, a rectangular shape which has two sets of sides opposite to each other, that is, a set of short sides and a set of long sides. In this case, the track direction a of the structure bodies 3 is preferably parallel to the extending direction (X axis direction) of the long sides which are one set of sides of the two sets of sides. Thereby, the scattered light Ls can be scattered so as to be distant from the optical axis 1 in the extending direction (Y axis direction) of the short sides having the smaller width in the imaging region $A_1$, and thus it is possible reduce a light amount of the scattered light Ls reaching the imaging region $A_1$ of the imaging device 112.

As described above, in the case where the track direction a of the structure bodies 3 and the extending direction (X axis direction) of the long sides of the imaging region $A_1$ have a parallel relationship, as shown in FIG. 6B, it is preferable that (a) the structure body 3 be formed as a cone of which the bottom surface has an elliptical shape including a long axis and a short axis, and (b) the direction of the long axis of the bottom surface of the structure body 3 correspond with the track direction a. (a) The structure body 3 is formed as a cone of which the bottom surface has an elliptical shape including a long axis and a short axis, and thereby the track pitch Tp can be reduced as compared with a case where the bottom surface of the structure body 3 is formed to be circular. Thereby, the light beam $L_O$ from a light source such as a light spot can be scattered so as to be further distant from the optical axis 1 as compared with a case where the bottom surface of the structure body 3 is formed to be circular. (b) The direction of the long axis of the bottom surface corresponds with the track direction a, and thereby the light beam $L_O$ from a light source such as a light spot can be scattered in the extending direction of the short sides having the smaller width in the imaging region $A_1$. Therefore, through a combination of the configuration (a) and the configuration (b), the light beam $L_O$ from a light source such as a light spot can be scattered so as to become distant in the Y axis direction from the optical axis 1 as compared with a case where the bottom surface of the structure body 3 is formed to be circular. Therefore, a light amount of the scattered light Ls reaching the imaging region $A_1$ of the imaging device 112 can be further reduced.

Configuration of Roll Stamper

Figure 7A:
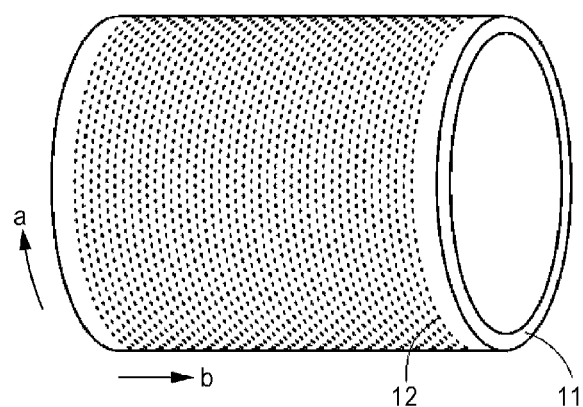
FIG. 7A is a perspective view illustrating an example of the configuration of the roll stamper.
Figure 7B:
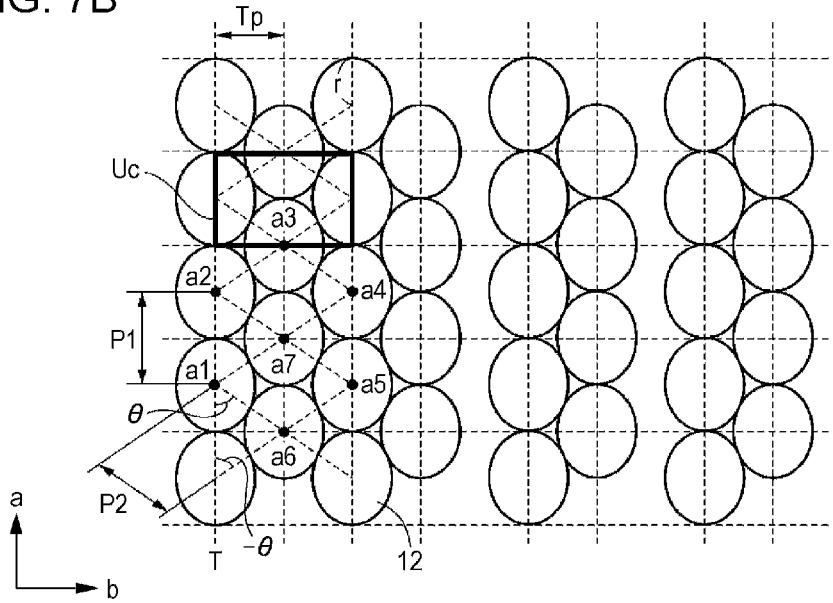
FIG. 7B is an enlarged plan view of a part of the roll stamper shown in FIG. 7A.
Figure 7C:
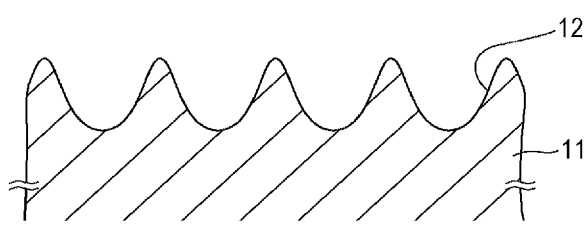
FIG. 7C is a cross-sectional view of the track of FIG. 7B.

FIG. 7A is a perspective view illustrating an example of the configuration of the roll stamper. FIG. 7B is an enlarged plan view of a part of the roll stamper shown in FIG. 7A. FIG. 7C is a cross-sectional view of the track T of FIG. 7B. The roll stamper 11 is a stamper for forming a plurality of structure bodies 3 on the above-described base surface. The roll stamper 11 has, for example, a columnar shape or a cylindrical shape, and the columnar surface or the cylindrical surface is a formation surface for forming a plurality of structure bodies 3 on the base surface. The formation surface has a plurality of structure bodies 12 which is arranged in a two-dimensional manner. The structure bodies 12 have, for example, a concave shape with respect to the formation surface. A material of the roll stamper 11 may use, for example, glass, but is not particularly limited to this material.

A plurality of structure bodies 12 disposed on the formation surface of the roll stamper 11 and a plurality of structure bodies 3 disposed on the surface of the semi-transmissive mirror 2 have a reversed concave-and-convex relationship. That is to say, the shape, the arrangement, and the disposition pitch of the structure bodies 12 of the roll stamper 11 are the same as those of the structure bodies 3 of the semi-transmissive mirror 2.

Configuration of Exposure Device

Figure 8:
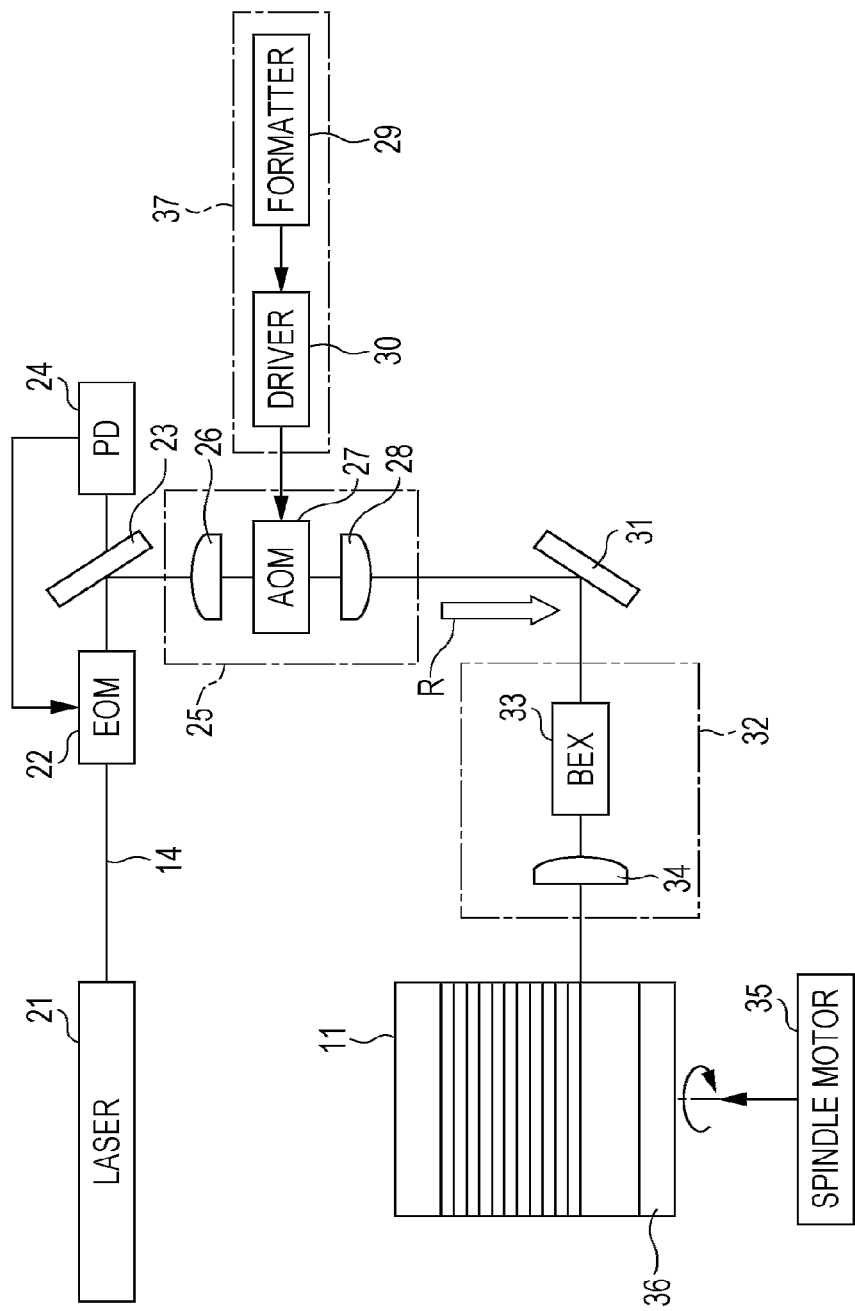
FIG. 8 is a schematic diagram illustrating an example of the configuration of the roll stamper exposure device.

FIG. 8 is a schematic diagram illustrating an example of the configuration of the roll stamper exposure device for manufacturing the roll stamper. The roll stamper exposure device is based on an optical disc recording device.

A laser light source 21 is a light source for exposing a resist formed on the surface of the roll stamper 11 as a recording medium, and oscillates recording laser light 14 of, for example, a wavelength $\lambda=266$ nm.

The laser light 14 emitted from the laser light source 21 rectilinearly propagates in a parallel beam state and is incident to an electro-optical modulator (EOM) 22. The laser light 14 passing through the electro-optical modulator 22 is reflected by a mirror 23 and is guided to a modulation optical system 25.

The mirror 23 includes a polarization beam splitter, and reflects one polarization component and transmits the other polarization component beam therethrough. The polarization component passing through the mirror 23 is sensed by a photodiode 24, and a phase of the laser light 14 is modulated by controlling the electro-optical modulator 22 based on the sensed signal.

In the modulation optical system 25, the laser light 14 is collected at an acousto-optic modulator (AOM) 27 made of glass ($SiO_2$) by a condensing lens 26. The laser light 14 modulates its intensity by the acousto-optic modulator 27 and is diffused, and then is changed to a parallel beam by a lens 28. The laser light 14 emitted from the modulation optical system 25 is reflected by a mirror 31 and is guided to a movable optical table 32 in a horizontal and parallel manner.

The movable optical table 32 includes a beam expander 33, and an objective lens 34. The laser light 14 guided to the movable optical table 32 is formed to have a desired beam shape by the beam expander 33, and then is applied to a resist layer on the roll stamper 11 via the objective lens 34. The roll stamper 11 is placed on a turntable 36 connected to a spindle motor 35. The resist layer is intermittently irradiated with the laser light 14 while rotating the roll stamper 11 and moving the laser light 14 in the height direction of the roll stamper 11, thereby performing the exposure process for the resist layer. A formed latent image has a substantially elliptical shape having the long axis in the circumferential direction. The movement of the laser light 14 is performed through the movement of the movable optical table 32 in the direction of the arrow R.

The exposure device has a control mechanism 37 for forming a latent image corresponding to a two-dimensional pattern of the hexagonal grid or the quasi-hexagonal grid shown in FIG. 5B, on the resist layer. The control mechanism 37 includes a formatter 29 and a driver 30. The formatter 29 includes a polarity reversing unit, and the polarity reversing unit controls application timing of the laser light 14 to the resist layer. The driver 30 controls the acousto-optic modulator 27 in response to an output from the polarity reversing unit.

In the roll stamper exposure device, a signal for synchronizing the polarity reversion formatter signal with a rotation controller of the recording device is generated such that two-dimensional patterns are linked spatially, and the intensity thereof is modulated by the acousto-optic modulator 27. A hexagonal grid pattern or a quasi-hexagonal grid pattern can be recorded through patterning at a constant angular velocity (CAV), at an appropriate rotation rate, at an appropriate modulation frequency, and at an appropriate feed length.

Manufacturing Method of Antireflection Optical Element

Next, a manufacturing method of the antireflection optical element 1 according to the first embodiment of the present disclosure will be described with reference to FIGS. 9A to 10C.

Resist Layer Forming Process

Figure 9A:
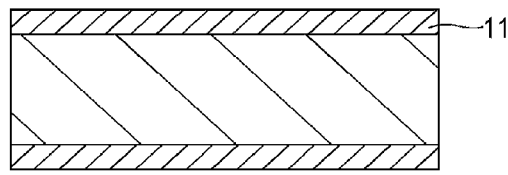
FIGS. 9A to 9D are process diagrams illustrating an example of the manufacturing method of the antireflection optical element according to the first embodiment of the present disclosure.
Figure 9B:
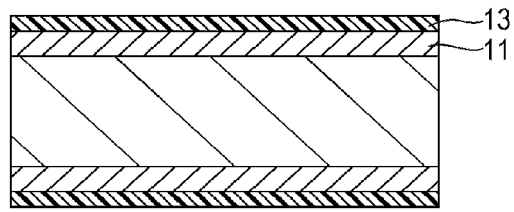

First, as shown in FIG. 9A, a columnar or cylindrical roll stamper 11 is prepared. The roll stamper 11 is, for example, a glass stamper. Next, as shown in FIG. 9B, a resist layer 13 is formed on the surface of the roll stamper 11. A material of the resist layer 13 may use either an organic resist or an inorganic resist. The organic resist may use, for example, a Novolak resist, a chemically amplified resist, or the like. In addition, the inorganic resist may use, for example, a metal compound including, for example, one or two or more kinds of transition metals.

Exposure Process

Figure 9C:
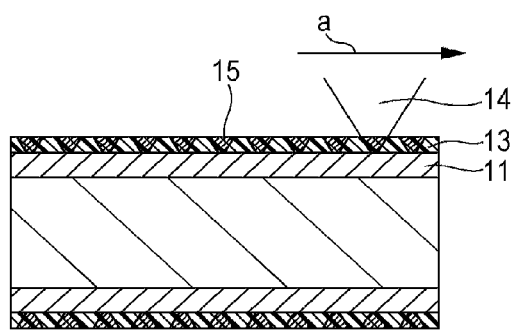

Next, as shown in FIG. 9C, the resist layer 13 formed on the surface of the roll stamper 11 is irradiated with the laser light (exposure beam) 14. Specifically, the roll stamper 11 is placed on the turntable 36 of the roll stamper exposure device shown in FIG. 8 and is rotated, and the resist layer 13 is irradiated with the laser light (exposure beam) 14. At this time, the resist layer 13 is entirely exposed by being intermittently irradiated with the laser light 14 while moving the laser light 14 in the height direction a of the roll stamper 11 (the direction parallel to the central axis of the columnar or cylindrical roll stamper 11). Thereby, latent images 15 according to the trajectories of the laser light 14 are formed on the entire surface of the resist layer 13, for example, with a pitch which is substantially the same as the wavelength of the visible light. In this exposure process, the track pitch Tp is varied due to the problem in the irradiation of the laser light 14. It is difficult to reduce the variation to an extent that the bright line noise is not generated or is not overly objectionable.

For example, the latent images 15 are disposed to form a plurality of lines of tracks on the roll stamper surface, and form the hexagonal grid pattern or the quasi-hexagonal grip pattern. The latent images 15 have, for example, elliptical shapes having the long axis in the extending direction of the track.

Developing Process

Figure 9D:
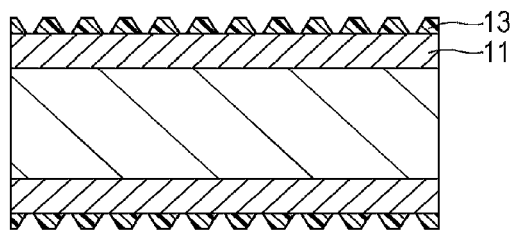

Next, for example, a developing solution is dropped on the resist layer 13 while rotating the roll stamper 11, and, the resist layer 13 is developed. Thereby, as shown in FIG. 9D, a plurality of openings are formed on the resist layer 13. In a case where the resist layer 13 is formed using a positive resist, the exposed parts which are exposed by the laser light 14 have a dissolution rate higher than the non-exposed parts with respect to the developing solution, and thus the pattern corresponding to the latent images (exposed parts) 16 is formed on the resist layer 13 as shown in FIG. 9D. The pattern of the openings is a predetermined grid pattern such as, for example, a hexagonal grid pattern or a quasi-hexagonal grid pattern.

Etching Process

Figure 10A:
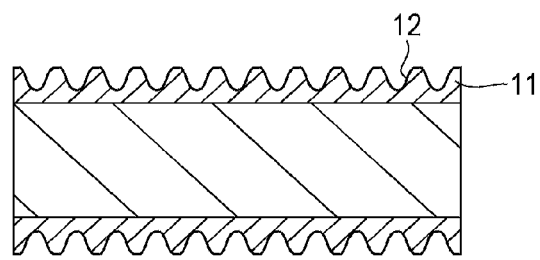
FIGS. 10A to 10C are process diagrams illustrating an example of the manufacturing method of the antireflection optical element according to the first embodiment of the present disclosure.

Next, the surface of the roll stamper 11 is etched by using the pattern (resist pattern) of the resist layer 13 formed on the roll stamper 11 as a mask. Thereby, as shown in FIG. 10A, it is possible to obtain concave portions of the elliptic cone shape or the circular truncated cone shape having the long axis in the extending direction of the tracks, that is, structure bodies 12. The etching method may use, for example, dry etching or wet etching. At this time, if etching and ashing are alternately performed, for example, a pattern of cone-shaped structure bodies 12 can be formed.

As described above, a desired roll stamper 11 can be obtained.

Transfer Process

Figure 10B:
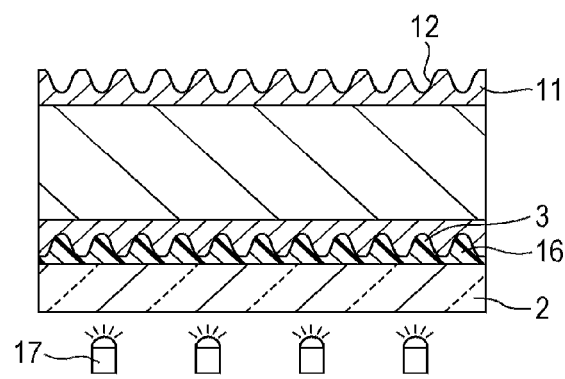
Figure 10C:
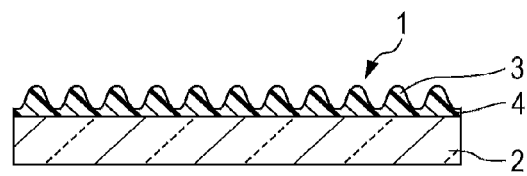

Next, as shown in FIG. 10B, after the roll stamper 11 comes into close contact with a transfer material 16 coated on the semi-transmissive mirror 2, the transfer material 16 is cured by irradiating the transfer material 16 with energy rays such as infrared rays from the energy ray source 17, and the semi-transmissive mirror 2 which is integrally formed with the cured transfer material 16 is peeled off therefrom. Thereby, as shown in FIG. 10C, the antireflection optical element 1 having a plurality of structure bodies 3 on the base surface is manufactured. Next, the antireflection optical element 1 may be cut to a desired size.

The energy ray source 17 may be a source which can emit energy rays such as electron beams, ultraviolet rays, infrared rays, laser beams, visible rays, ionizing radiation (X-rays, α-rays, β-rays, γ-rays, and the like), microwaves, and radio frequency, and is not particularly limited.

As the transfer material 16, an energy ray curable resin composition may be preferably used. As the energy ray curable resin composition, an ultraviolet curable resin composition is preferably used. The energy ray curable resin composition may optionally include a filler, a functional additive, and the like.

The ultraviolet curable resin composition includes, for example, acrylate and an initiator. The ultraviolet curable resin is made of, for example, a monofunctional monomer, a bifunctional monomer, a multifunctional monomer, or the like, and, specifically, is formed by using the following materials singly or a mixture thereof.

Examples of the monopolymer monomer include carboxylic acid (acrylic acid), hydroxy (2-hydroxyethyl acrylate, 2-hydroxypropyl acrylate, 4-hydroxybutyl acrylate), alkyl alicycles (isobutyl acrylate, t-butyl acrylate, isooctyl acrylate, lauryl acrylate, stearyl acrylate, isobutyl acrylate, cyclohexyl acrylate), other functional monomers (2-methoxy ethyl acrylate, methoxyethylene glycol acrylate, 2-ethoxy ethyl acrylate, tetrahydrofurfryl acrylate, benzyl acrylate, ethylcarbitol acrylate, phenoxyethyl acrylate, N,N-dimethyl aminoethyl acrylate, N,N-dimethyl aminopropyl acrylamide, N,N-dimethyl acrylamide, acryloylmorpholine, N-isopropyl acrylamide, N,N-diethyl acrylamide, N-vinylpyrrolidone), 2-(perfluorooctyl)ethyl acrylate, 3-perfluorohexyl-2-hydroxypropyl acrylate, 3-perfluorooctyl-2-hydroxypropyl acrylate, 2-(perfluorodecyl)ethyl acrylate, 2-(perfluoro-3-methylbutyl)ethyl acrylate, 2,4,6-tribromophenol acrylate, 2,4,6-tribromophenol methacrylate, 2-(2,4,6-tribromophenoxy)ethyl acrylate, 2-ethylhexyl acrylate, and the like.

Examples of the bifunctional monomer include tri(propylene glycol) diacrylate, trimethylolpropane diallyl ether, urethane acrylate, and the like.

Examples of the multifunctional monomer include trimethylolpropane triacrylate, dipentaerythritol penta-/hexaacrylate, di-trimethylolpropane tetraacrylate, and the like.

Examples of the initiator include 2,2-dimethoxy-1,2-diphenylethan-1-one, 1-hydroxy-cyclohexylphenyl ketone, 2-hydroxy-2-methyl-1-phenylpropane-1-one, and the like.

The filler may use, for example, both of inorganic and organic particles. Examples of the inorganic particles include metal oxide particles such as $SiO_2$, $TiO_2$, $ZrO_2$, $SnO_2$, $Al_2O_3$, and the like.

Examples of the functional additive include a leveling agent, a surface conditioner, an antifoaming agent, and the like. Examples of materials of the semi-transmissive mirror 2 include methyl methacrylate (co)polymer, polycarbonate, styrene (co)polymer, methyl methacrylate-styrene copolymer, cellulose diacetate, cellulose triacetate, cellulose acetate butyrate, polyester, polyamide, polyimide, polyether sulfone, polysulfone, polypropylene, polymethylpentene, polyvinyl chloride, polyvinyl acetal, polyether ketone, polyurethane, glass, and the like.

A formation method of the semi-transmissive mirror 2 is not particularly limited, and may be injection molding, extrusion, or cast molding. Optionally, a surface treatment such as a corona treatment may be performed for the base surface.

As described above, a desired antireflection optical element 1 can be obtained.

2. Second Embodiment

Configuration of Antireflection Optical Element

Figure 11A:
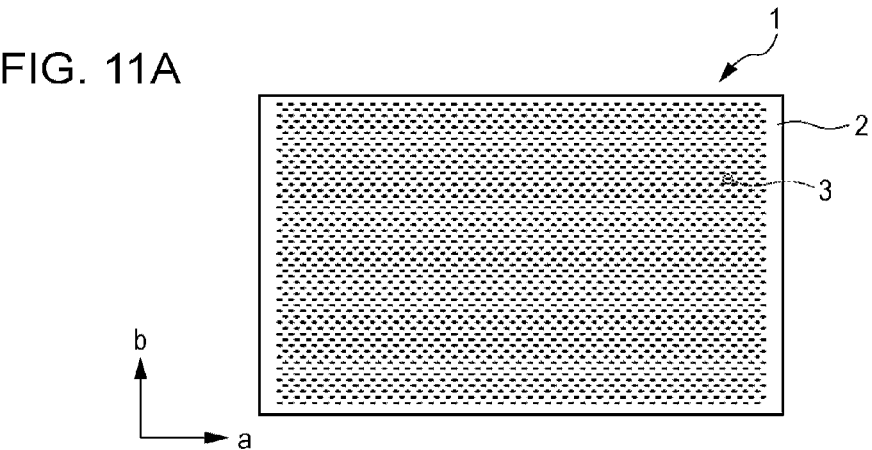
FIG. 11A is a plan view illustrating an example of the configuration of the antireflection optical element according to a second embodiment of the present disclosure.
Figure 11B:
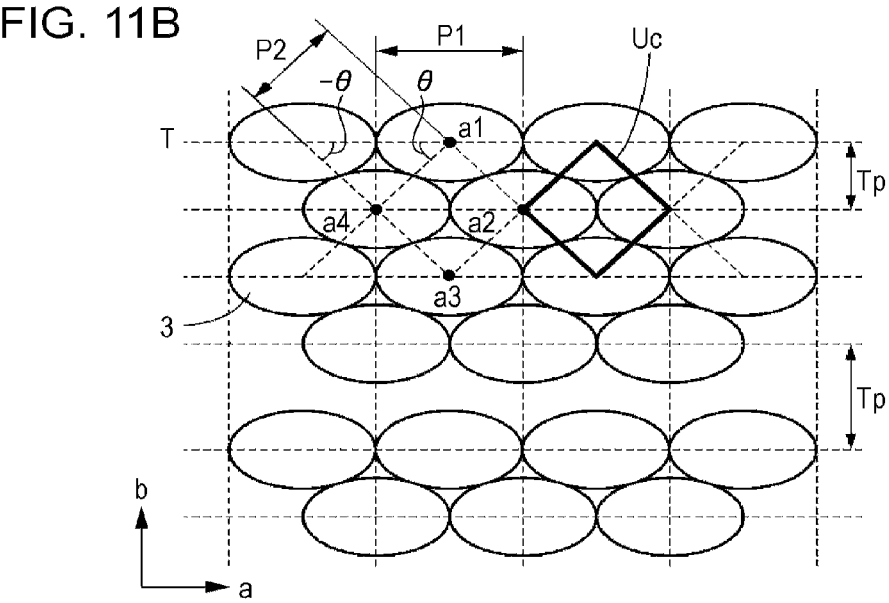
FIG. 11B is an enlarged plan view of the antireflection optical element shown in FIG. 11A.
Figure 11C:
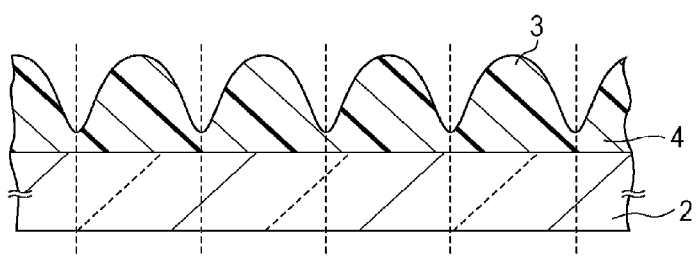
FIG. 11C is a cross-sectional view of the track of FIG. 11B.

FIG. 11A is a plan view illustrating an example of the configuration of the antireflection optical element according to a second embodiment of the present disclosure. FIG. 11B is an enlarged plan view of the antireflection optical element shown in FIG. 11A. FIG. 11C is a cross-sectional view of the track T of FIG. 11B.

The antireflection optical element 1 according to the second embodiment is different from that according to the first embodiment in that a plurality of structure bodies 3 in the three lines of tracks form a square grid pattern or a quasi-square grid pattern.

Here, the square grid refers to a grid with a square. The quasi-square grid refers to a grid with a distorted square. For example, in a case where the structure bodies 3 are disposed in a straight line shape, the quasi-square grid refers to a square grid which is distorted by stretching the grid with a square in the arrangement direction (track direction) of the straight line shape. In a case where the structure bodies 3 are arranged so as to be wobbled, the quasi-square grid refers to a square grid obtained by distorting the grid with a square through a wobble arrangement of the structure bodies 3, or a square grid which is distorted by stretching the grid with a square in the arrangement direction (track direction) of the straight line shape and further obtained by distorting the grid with a square through a wobble arrangement of the structure bodies 3.

The disposition pitch P1 of the structure bodies 3 in the same track is preferably longer than the disposition pitch P2 of the structure bodies 3 between the two adjacent tracks. If a disposition pitch of the structure bodies 3 in the same track is P1, and a disposition pitch of the structure bodies 3 between the two adjacent tracks is P2, a ratio P1/P2 preferably satisfies a relationship of $1.4<P1/P2\leq1.5$. In the numerical value range, it is possible to increase the filling rate of the structure bodies 3 having the elliptic cone shape or the circular truncated cone shape, and thus the antireflection characteristic can be improved. The height or the depth of the structure body 3 in the 45° direction or about 45° direction with respect to the track is preferably smaller than the height or the depth of the structure body 3 in the extending direction of the track.

The height H2 in the arrangement direction (θ direction) of the structure body 3 which is tilted with respect to the extending direction of the track is preferably smaller than the height H1 of the structure body 3 in the extending direction of the track. In other words, a relationship between the heights H1 and H2 of the structure body 3 preferably satisfies H1>H2.

In a case where the structure bodies 3 form the square grid or the quasi-square grid, the ellipticity e of the structure body bottom surface is preferably $140\%\leq e\leq 180\%$. This is because, in this range, the filling rate of the structure bodies 3 is increased, and thus it is possible to improve the antireflection characteristic.

The filling rate of the structure bodies 3 on the base surface is 65% or more, preferably 73% or more, more preferably 86% or more, as the upper limit of 100%. In the filling rate of this range, it is possible to improve the antireflection characteristic.

Here, the filling rate (average filling rate) of the structure bodies 3 is a value obtained as follows.

First, a surface of the antireflection optical element 1 is photographed in top view using a scanning electron microscope (SEM). Next, a unit grid Uc is randomly selected from the captured SEM picture, and a disposition pitch P1 and a track pitch Tp of the unit grid Uc are measured (refer to FIG. 11B). In addition, the area S of the bottom surface of any one of the four structure bodies 3 included in the unit grid Uc is measured through an image process. Next, the filling rate is obtained from the following expression (4) using the measured disposition pitch P1, track pitch Tp, and bottom surface area S.

Filling rate=(S(tetra)/S(unit))×100

Unit grid area: $S(\text{unit})=2\times((P1\times Tp)\times(\frac{1}{2}))=P1\times Tp$ Area of bottom surface of structure bodies located in the unit grid: $S(\text{tetra})=S$     (4)

The above-described filling rate calculation process is performed for ten unit grids which are randomly selected from the captured SEM picture. In addition, an average of the filling rates is obtained by simply averaging (arithmetically averaging) measured values, and is used as a filling rate of the structure bodies 3 on the base surface.

The ratio ((2r/P1)×100) of the diameter 2r to the disposition pitch P1 is 64% or more, preferably, 69% or more, and more preferably 73% or more. This is because, in this range, the filling rate of the structure bodies 3 is increased, and thus it is possible to improve the antireflection characteristic. Here, the disposition pitch P1 is a disposition pitch in the track direction of the structure bodies 3, and the diameter 2r is a diameter of the bottom surface of the structure body in the track direction. In addition, if the structure body bottom surface is circular, the diameter 2r is a diameter, and if the structure body bottom surface is elliptical, the diameter 2r is a major axis.

The second embodiment is the same as the first embodiment except for the above description.

3. Third Embodiment

Figure 12A:
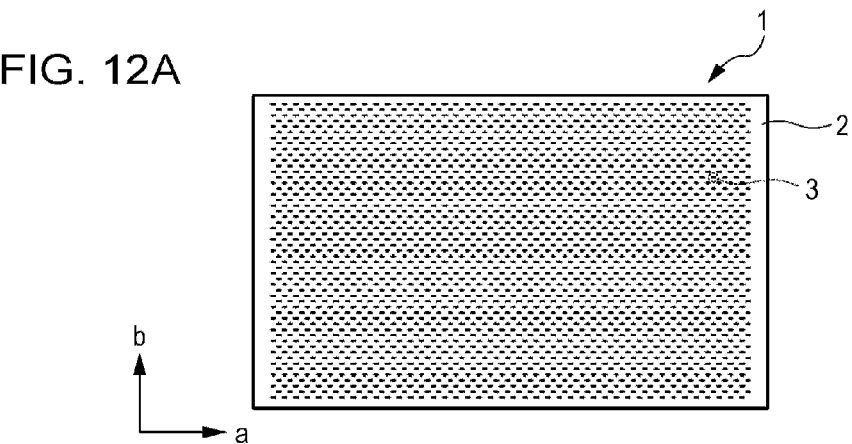
FIG. 12A is a plan view illustrating an example of the configuration of the antireflection optical element according to a third embodiment of the present disclosure.
Figure 12B:
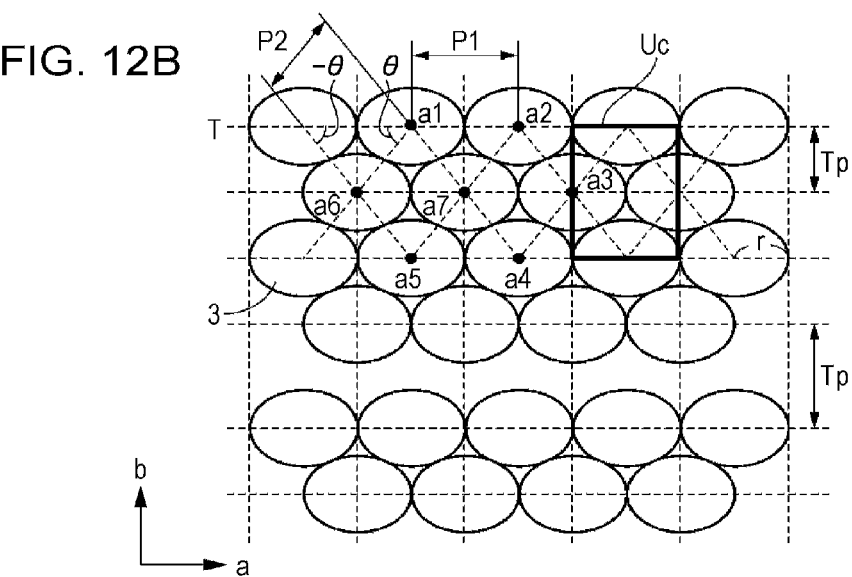
FIG. 12B is an enlarged plan view of the antireflection optical element shown in FIG. 12A.
Figure 12C:
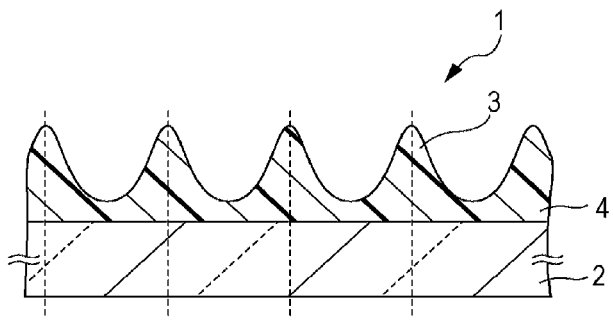
FIG. 12C is a cross-sectional view of the track of FIG. 12B.

FIG. 12A is a plan view illustrating an example of the configuration of the antireflection optical element according to a third embodiment of the present disclosure. FIG. 12B is an enlarged plan view of the antireflection optical element shown in FIG. 12A. FIG. 12C is a cross-sectional view of the track T of FIG. 12B.

The antireflection optical element 1 according to the third embodiment is different from that according to the first embodiment in that concave structure bodies 3 are arranged in a plurality on the base surface. The shape of the structure body 3 is a concave shape obtained by reversing the convex shape of the structure body 3 according to the first embodiment. In addition, in a case where the structure body 3 has a concave shape as described above, an opening (entrance of the concave portion) of the structure body 3 with the concave shape is defined as a lower part, and the lowermost part (deepest part in the concave portion) of the semi-transmissive mirror 2 in the depth direction is defined as a top. That is to say, the top and the lower part are defined using the structure body 3 which is a non-substantial space. In addition, in the fourth embodiment, since the structure body 3 has a concave shape, the height H of the structure body 3 in the expression (1) and the like is replaced with the depth H of the structure body 3.

The third embodiment is the same as the first embodiment except for the above description.

4. Fourth Embodiment

Outline of Fourth Embodiment

The fourth embodiment has been devised as a result of the following examination.

As described in the first embodiment, as a result of the keen examination, the present inventors have found that occurrence of the bright line noise in a captured image is caused by a variation in the disposition pitch Tp of the sub-wavelength structure bodies. Therefore, the present inventors have examined suppression of occurrence of the linear bright line noise using a technique different from that according to the first embodiment. As a result, it has been found that light from a light source such as a light spot is widely diffused in a direction perpendicular to the lines of the sub-wavelength structure bodies by varying disposition locations of the sub-wavelength structure bodies in a two-dimensional manner, thereby suppressing occurrence of the bright line noise.

Configuration of Imaging Apparatus

The imaging apparatus according to the fourth embodiment of the present disclosure is the same as that according to the first embodiment except for a disposition form of the structure bodies 3 formed on the antireflection optical element surface. Therefore, the disposition form of the structure bodies 3 will be described.

Disposition Form of Structure Bodies

Figure 13A:
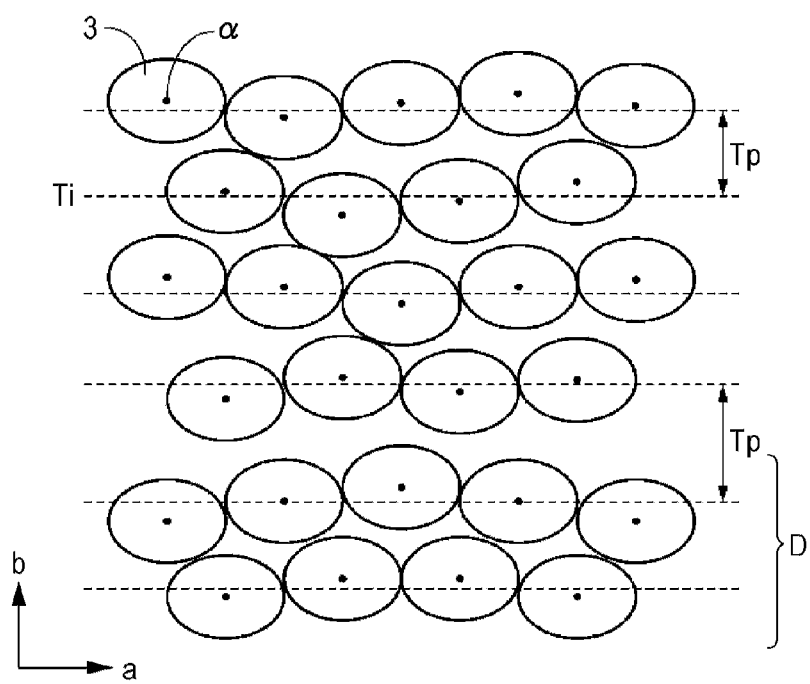
FIG. 13A is an enlarged plan view of a part of the antireflection optical element surface according to a fourth embodiment of the present disclosure.

FIG. 13A is an enlarged plan view of a part of the antireflection optical element surface according to a fourth embodiment of the present disclosure. As shown in FIG. 13A, the central positions α of a plurality of structure bodies 3 are varied in the inter-track direction (inter-line direction) b with respect to the virtual track Ti. If the central positions α of the structure bodies 3 are varied, light from a light source such as a light spot can be widely diffused in a two-dimensional manner. Therefore, it is possible to suppress occurrence of the bright line noise in a captured image. The variation in the central positions α of the structure bodies 3 is regular or irregular, and is preferably irregular from the viewpoint of reduction in occurrence of the bright line noise in a captured image. In addition, from the viewpoint of improvement in the filling rate of the structure bodies 3, as in the section D shown in FIG. 13A, directions of variations are preferably synchronized with each other between the virtual tracks Ti.

Virtual Track

Figure 13B:
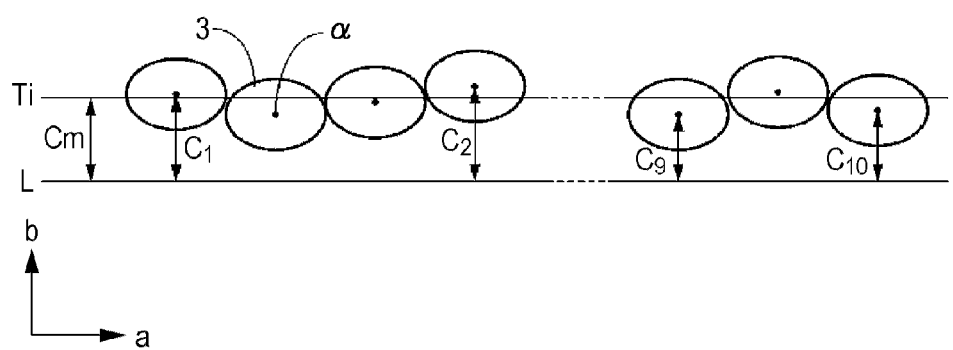
FIG. 13B is a schematic diagram illustrating the definition of the virtual track.

FIG. 13B is a schematic diagram illustrating the definition of the virtual track Ti. The virtual track Ti is a virtual track obtained from an average position of the central positions α of the structure bodies 3, and can be obtained in detail as follows.

First, a surface of the antireflection optical element is photographed in top view using a scanning electron microscope (SEM). Next, one line of the structure bodies 3 where the virtual track Ti is obtained is selected from the captured SEM picture. Next, ten structure bodies 3 are randomly selected from the selected line. Then, a straight line L perpendicular to the variation direction b of the structure bodies 3 is set, and central positions $C_1, C_2, \ldots,$ and $C_{10}$ of the respective selected structure bodies 3 are obtained with respect to the straight line L. Next, an average central position Cm ($=(C_1+C_2+\ldots+C_{10})/10$) of the structure bodies 3 is obtained by simply averaging (arithmetically averaging) the central positions of the ten obtained structure bodies 3. Thereafter, a straight line which passes through the obtained average central position Cm and is parallel to the straight line L is obtained, and this straight line is used as the virtual track Ti. Further, the track pitch Tp of the virtual tracks Ti is varied between the tracks as shown in FIG. 13A, due to the problem when the exposure is performed in the stamper creation process.

Variation Width

Figure 14A:
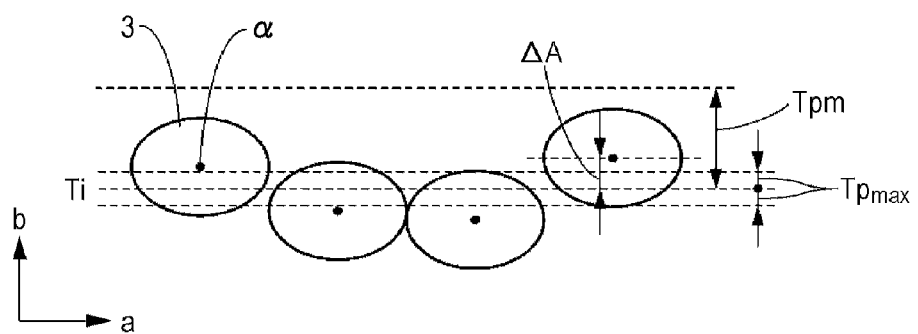
FIG. 14A is a schematic diagram illustrating a variation width of central positions of the structure bodies.

FIG. 14A is a schematic diagram illustrating the variation width of central positions of the structure bodies. If the maximum value of the variation widths ΔTp of the track pitches Tp is $\Delta Tp_{max}$, the variation width ΔA of the central positions α of the structure bodies 3 is preferably larger than $\Delta Tp_{max}$. Thereby, it is possible to reduce occurrence of the linear bright line noise. Here, the variation width ΔA of the central positions α of the structure bodies 3 is a variation width using the virtual track Ti as a reference.

Maximum Variation Width $\Delta Tp_{max}$ of Track Pitches Tp

The maximum variation width $\Delta Tp_{max}$ of the track pitches Tp can be obtained as follows.

First, a surface of the antireflection optical element 1 is photographed in top view using an SEM. Next, a set of adjacent lines of the structure bodies 3 is selected from the captured SEM picture. Next, the virtual track Ti is obtained from each of the selected set of lines of the structure bodies 3. Then, the track pitch Tp between the obtained virtual tracks Ti is obtained. The above-described process of obtaining the track pitch Tp is performed for ten parts which are randomly selected from the captured SEM picture. In addition, an average track pitch Tpm is obtained by simply averaging (arithmetically averaging) the track pitches Tp obtained from the ten parts.

Next, an absolute value (|Tp−Tpm|) of a difference between the average track pitch Tpm obtained as described above and the track pitch Tp is obtained and is used as the variation width ΔTp of the track pitch Tp. The variation widths ΔTp of a plurality of track pitches Tp are obtained as described above, and the maximum value is selected therefrom and is used as the maximum variation width $\Delta Tp_{max}$.

Variation Rate

Figure 14B:
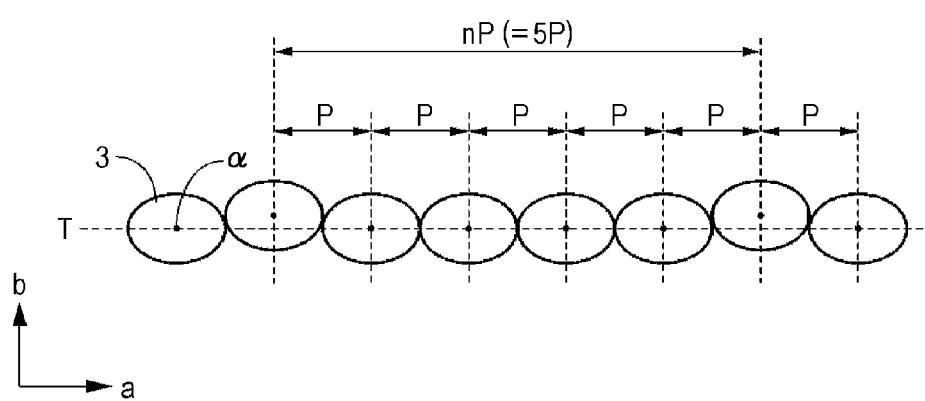
FIG. 14B is a schematic diagram illustrating a variation rate of the structure bodies.

FIG. 14B is a schematic diagram illustrating the variation rate of the structure bodies. If the disposition pitch of the structure bodies 3 in the track direction a is a disposition pitch P, the central positions α of the structure bodies 3 are preferably varied in the inter-track direction b at such a frequency that can suppress occurrence of the linear bright line noise. Specifically, the central positions α of the structure bodies 3 are preferably varied in the inter-track direction b at the distance equal to or less than a predetermined distance (predetermined period) nP (where n is a natural number, for example, n=5) with respect to the track direction a. More specifically, the central positions α of the structure bodies 3 are preferably varied in the inter-track direction b at a rate equal to or less than one of a predetermined number n (where n is a natural number, for example, n=5) with respect to the track direction a.

Example of Disposition Form of Structure Bodies

Figure 15A:
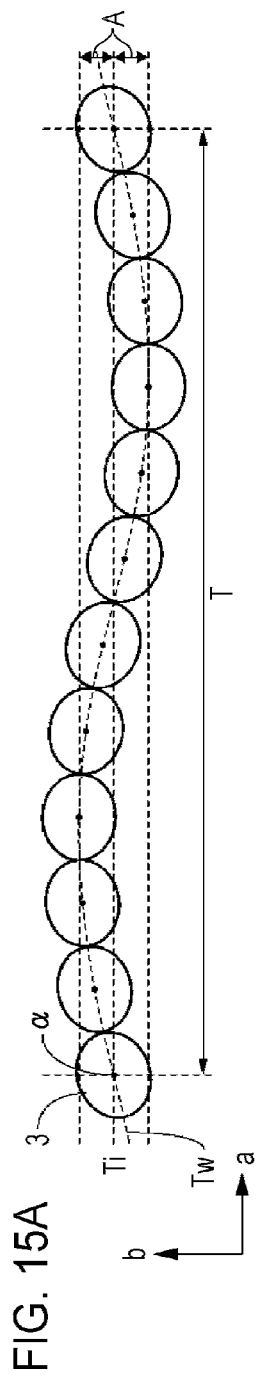
FIGS. 15A and 15B are schematic diagrams illustrating a first example of the disposition form of the structure bodies.

FIG. 15A is a schematic diagram illustrating a first example of the disposition form of the structure bodies. As shown in FIG. 15A, in the first example, the central positions α of the structure bodies 3 are varied so as to be wobbled. Specifically, the central positions α of the structure bodies 3 are disposed on a wobbled track (hereinafter, referred to as a wobble track) Tw.

The wobble tracks Tw are preferably synchronized with each other. A unit grid shape such as a (quasi-)square grid shape or a (quasi-)hexagonal grid is maintained by synchronizing the wobble tracks Tw with each other, and thus it is possible to maintain the filling rate to be high. A waveform of the wobble track Tw includes, for example, a sine curve, a triangular wave, and the like, but is not limited thereto.

Figure 15B:
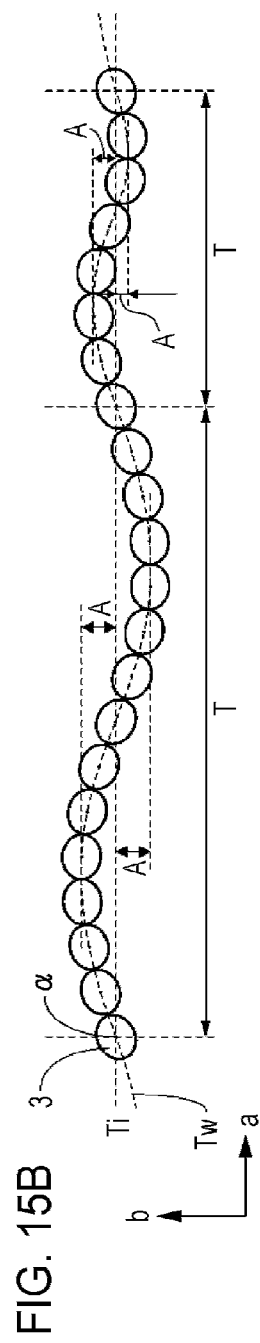

The period T and the amplitude A of the wobble track Tw may be regular or irregular, and, from the viewpoint of reduction in the linear bright line noise, as shown in FIG. 15B, at least one of the period T and the amplitude A is preferably irregular, and both of them are more preferably irregular. In addition, the variation in the amplitude A of the wobble track Tw is not limited to the period unit, but the amplitude A may be varied within one period.

Figure 15C:
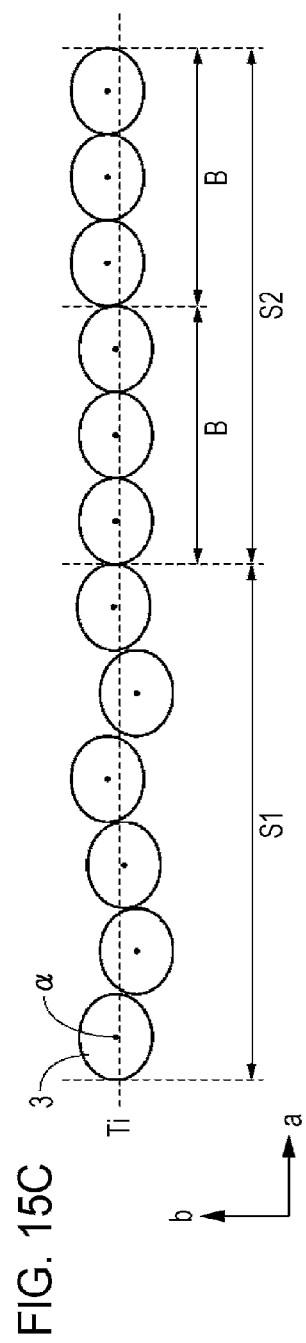
FIG. 15C is a schematic diagram illustrating a second example of the disposition form of the structure bodies.

FIG. 15C is a schematic diagram illustrating a second example of the disposition form of the structure bodies. As shown in the section S1 of FIG. 15C, in the second example, the central positions α of the respective structure bodies 3 are varied independently with respect to each other in the inter-track direction b with respect to the virtual track Ti. In addition, as shown in the section S2 of FIG. 15C, a block (structure body group) B may be formed by a predetermined number of structure bodies 3 which are adjacent to each other in the track direction a, and the central positions α of the structure bodies 3 may be varied using the block B as one variation unit. Here, the variation in the central positions α of the structure bodies 3 may be regular or irregular, and is preferably irregular from the viewpoint of reduction in the linear bright line noise. In addition, although an example where two disposition forms indicated by the section S1 and the section S2 are mixed in one line is shown in FIG. 15C, the disposition forms are not necessarily used so as to be mixed, and any one of the disposition forms may be formed on the antireflection optical element surface.

Ratio of Intensity Ib of Scattered Light to Intensity Ia of Incident Light

A ratio (Ib/Ia) of a sum of the intensities Ib of the scattered light beams Ls which are scattered by the surface of the antireflection optical element to a sum of intensities Ia of incident light beams which are incident to the surface of the antireflection optical element 1 is in a range preferably less than 1/500, more preferably equal to or less than 1/5000, and, most preferably, equal to or less than $1/10^5$. If the ratio (Ib/Ia) is less than 1/500, it is possible to suppress occurrence of the linear bright line noise.

5. Fifth Embodiment

Disposition Form of Structure Bodies

Figure 16A:
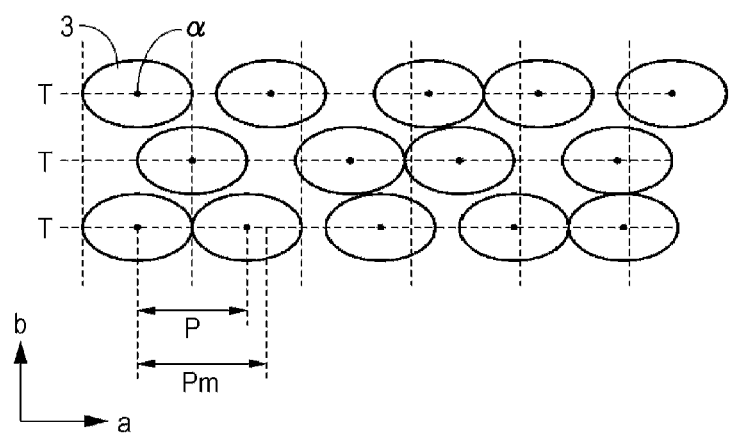
FIG. 16A is an enlarged plan view of a part of the antireflection optical element surface according to a fifth embodiment of the present disclosure.

FIG. 16A is an enlarged plan view of a part of the antireflection optical element surface according to a fifth embodiment of the present disclosure. As shown in FIG. 16A, the fifth embodiment is different from the fourth embodiment in that the disposition pitch P of the structure bodies 3 in the same track is varied with respect to the average disposition pitch Pm.

Variation Width

Figure 16B:
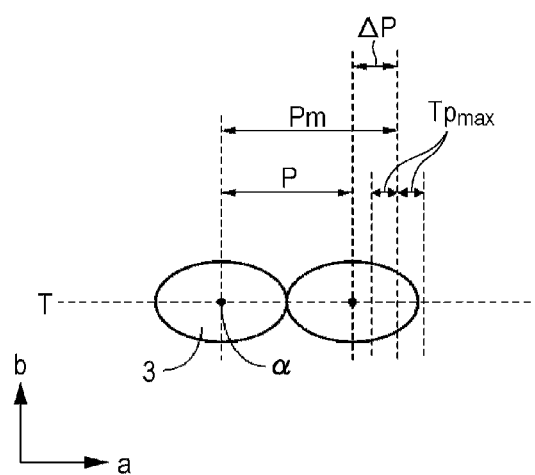
FIG. 16B is a schematic diagram illustrating a variation width of the disposition pitch of the structure bodies.

FIG. 16B is a schematic diagram illustrating a variation width of the disposition pitch P of the structure bodies. If the maximum value of the variation widths ΔTp of the track pitches Tp is $\Delta Tp_{max}$, the variation width ΔP of the disposition pitch P is preferably larger than $\Delta Tp_{max}$. Thereby, it is possible to reduce occurrence of the linear bright line noise. Here, the variation width ΔP of the disposition pitch P is a variation width using the average disposition pitch Pm as a reference.

Average Disposition Pitch Pm

The average disposition pitch Pm can be obtained as follows.

First, a surface of the antireflection optical element is photographed in top view using an SEM. Next, one track T is selected from the captured SEM picture. Then, a set of two adjacent structure bodies 3 is selected from a plurality of structure bodies 3 disposed on the selected track T, and a disposition pitch P in the track direction a is obtained. The above-described process of obtaining the disposition pitch P is performed for ten parts which are randomly selected from the captured SEM picture. In addition, an average track pitch Pm is obtained by simply averaging (arithmetically averaging) the track pitches P obtained from the ten parts.

6. Sixth Embodiment

Although an example where the present disclosure is applied to the digital camera (digital still camera) as an imaging apparatus has been described in the first embodiment, an application example of the present disclosure is not limited thereto. In the sixth embodiment of the present disclosure, an example where the present disclosure is applied to a digital video camera will be described.

Figure 17:
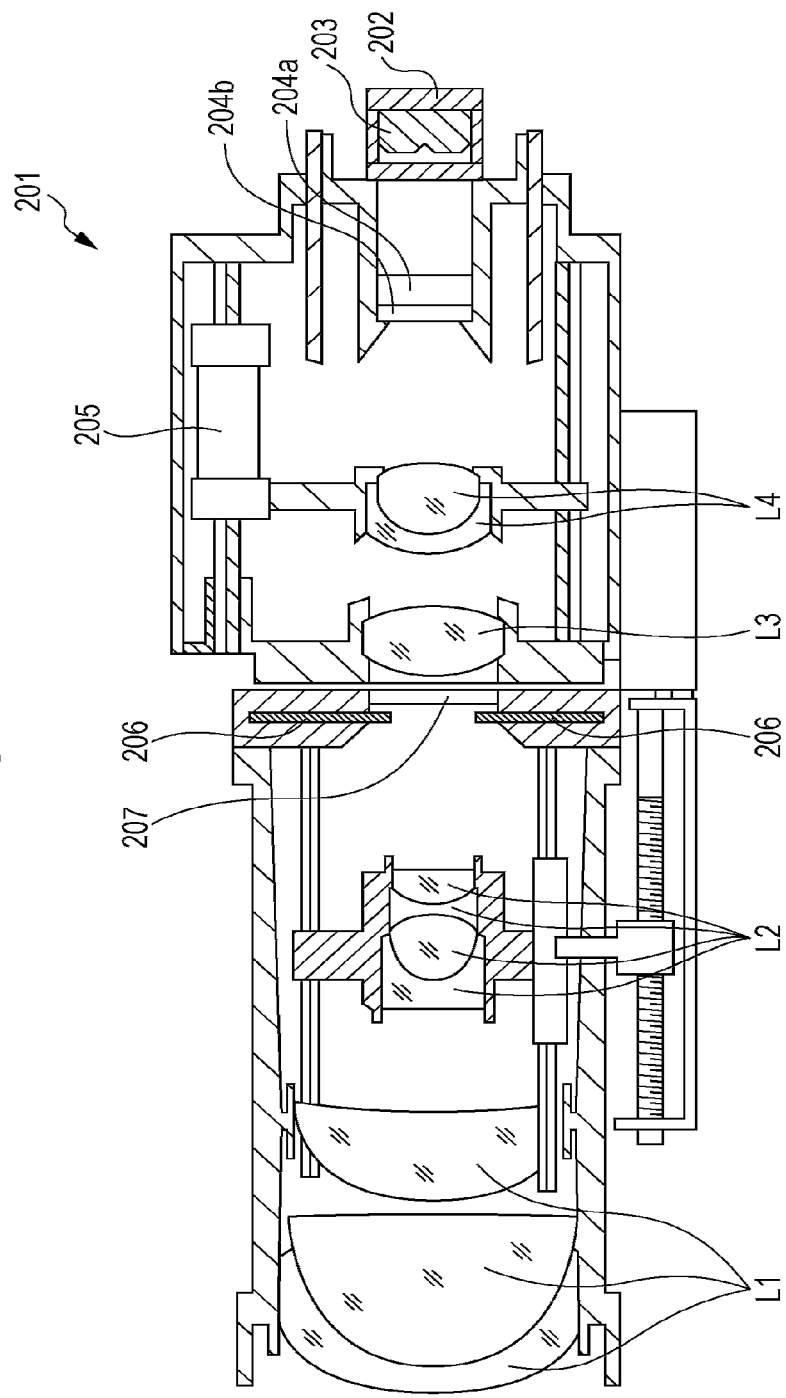
FIG. 17 is a schematic diagram illustrating an example of the imaging apparatus according to a sixth embodiment of the present disclosure.

FIG. 17 is a schematic diagram illustrating an example of the configuration of the imaging apparatus according to the sixth embodiment of the present disclosure. As shown in FIG. 17, the imaging apparatus 201 according to the sixth embodiment is a so-called digital video camera, and includes a first lens group L1, a second lens group L2, a third lens group L3, a fourth lens group L4, a solid-state imaging device 202, a low-pass filter 203, a filter 204, a motor 205, an iris blade 206, and an electric light control element 207.

In the imaging apparatus 201, the first lens group L1, the second lens group L2, the third lens group L3, the fourth lens group L4, the solid-state imaging device 202, the low-pass filter 203, the filter 204, the iris blade 206, and the electric light control element 207, form an imaging optical system.

The first lens group L1 and the third lens group L3 are fixed lenses. The second lens group L2 is a zoom lens. The fourth lens group L4 is a focus lens.

The solid-state imaging device 202 converts incident light into an electric signal which is supplied to a signal processing unit (not shown). The solid-state imaging device 202 is, for example, a CCD (Charge Coupled Device).

The low-pass filter 203 is provided in front of the solid-state imaging device 202. The low-pass filter 203 is used to suppress a spurious signal (moiré) which occurs when a striped pattern image close to a pixel pitch is captured, and is constituted by, for example, synthetic quartz.

The filter 204 is used to, for example, cut an infrared region of light incident to the solid-state imaging device 202, and make light intensity of a visible region (400 nm to 700 nm) uniform by suppressing spectroscopic float of a near infrared region (630 nm to 700 nm). The filter 204 includes, for example, an infrared cut filter (hereinafter, referred to as an IR cut filter) 204a, and an IR cut coat layer 204b which is formed by laminating an IR cut coat on the IR cut filter 204a. Here, the IR cut coat layer 204b is formed on at least one of the subject side surface of the IR cut filter 204a and the solid-state imaging device 202 side surface of the IR cut filter 204a. FIG. 17 shows an example where the IR cut coat layer 204b is formed on the subject side surface of the IR cut filter 204a.

The motor 205 moves the fourth lens group L4 based on a control signal supplied from a controller (not shown). The iris blade 206 is used to adjust an amount of light incident to the solid-state imaging device 202 and is driven by a motor (not shown).

The electric light control element 207 is used to adjust an amount of light incident to the solid-state imaging device 202. The electric light control element 207 is an electric light control element constituted by liquid crystal which includes at least a dye based colorant, and is constituted by, for example, a dichroic GH liquid crystal.

A plurality of structure bodies are formed on a surface of at least one optical element or an optical element group (hereinafter, referred to as an optical unit) of the first lens group L1, the second lens group L2, the third lens group L3, and the fourth lens group L4, the low-pass filter 203, the filter 204, and the electric light control element 207, which form the imaging optical system. Configurations, shapes, disposition forms, and the like of the structure bodies may be the same as, for example, those of any one of the first to fifth embodiments described above.

Specifically, in a case where a plurality of structure bodies are formed on the surface of the filter 204 or the third lens group L3 which is provided on the front side (subject side) of the solid-state imaging device 202 so as to be spaced apart therefrom in the optical unit forming the imaging optical system, configurations, shapes, disposition forms, and the like of the structure bodies are preferably the same as those of any one of the first to fifth embodiments described above. In a case where a plurality of structure bodies are formed on surfaces of the optical unit other than the filter 204 and the third lens group L3 provided on the front side of the solid-state imaging device 202 so as to be spaced apart therefrom, configurations, shapes, disposition forms, and the like of the structure bodies are preferably the same as those of the above-described fourth embodiment or fifth embodiment. Particularly, in a case where a plurality of structure bodies are formed on surfaces of the low-pass filter 203 which is closely provided on the front side of the solid-state imaging device 202, configurations, shapes, disposition forms, and the like of the structure bodies are preferably the same as those of the above-described fourth embodiment or fifth embodiment.

Configurations of Present Disclosure

In addition, the present disclosure may have the following configurations.

(1) An optical element including a base having a surface; and a plurality of sub-wavelength structure bodies formed on the surface of the base, wherein the plurality of sub-wavelength structure bodies form a plurality of lines, and wherein central positions of the sub-wavelength structure bodies are varied in an inter-line direction.

Here, the optical element is an optical element having an antireflection function. The base is an optical element body which gives the antireflection function using the sub-wavelength structure bodies. The optical element body may include, for example, a lens, a lens filer, a semi-transmissive mirror, a light control element, a prism, a polarization element, and the like, but is not limited thereto.

(2) The optical element set forth in (1), wherein the variation is irregular.

(3) The optical element set forth in (1) or (2), wherein if a maximum value of the variation widths $\Delta Tp$ of inter-line pitches is $\Delta Tp_{max}$, the central positions of the sub-wavelength structure bodies are varied so as to be larger than $\Delta Tp_{max}$ in the inter-line direction.

(4) The optical element set forth in (1) or (2), wherein the line is wobbled.

(5) The optical element set forth in (4), wherein at least one of the period or the amplitude of the wobble of the line is irregular.

(6) The optical element set forth in (1) or (2), wherein the central positions of the sub-wavelength structure bodies are varied independently with respect to each other in the inter-line direction.

(7) The optical element set forth in (1) or (2), wherein the sub-wavelength structure bodies which are adjacent in the line direction form a block, and wherein the central positions of the sub-wavelength structure bodies are varied in the inter-line direction with the block units.

(8) An optical element including a base having a surface; and a plurality of sub-wavelength structure bodies formed on the surface of the base, wherein the plurality of sub-wavelength structure bodies form a plurality of lines, and wherein a disposition pitch P of the sub-wavelength structure bodies in the same line is varied with respect to an average disposition pitch Pm.

(9) The optical element set forth in (8), wherein the variation is irregular.

(10) The optical element set forth in (8) or (9), wherein if a maximum value of the variation widths of inter-line pitches is $\Delta Tp_{max}$, a variation width $\Delta P$ of the disposition pitch P with respect to the average disposition pitch Pm is varied so as to be larger than $\Delta Tp_{max}$.

(11) The optical element set forth in (8) or (9), wherein the disposition pitches P of the sub-wavelength structure bodies are varied independently with respect to each other in the line direction.

(12) The optical element set forth in (8) or (9), wherein the sub-wavelength structure bodies which are adjacent in the line direction form a block, and wherein the disposition pitch P of the sub-wavelength structure bodies is varied in the line direction with the block units.

(13) An optical system including one or two or more optical elements having a surface on which a plurality of sub-wavelength structure bodies are formed, wherein the optical element includes a base having a surface; and a plurality of sub-wavelength structure bodies formed on the surface of the base, wherein the plurality of sub-wavelength structure bodies form a plurality of lines, and wherein central positions of the sub-wavelength structure bodies are varied in an inter-line direction.

(14) The optical system set forth in (13), wherein the variation is irregular.

(15) The optical system set forth in (13) or (14), wherein if a maximum value of the variation widths $\Delta Tp$ of inter-line pitches is $\Delta Tp_{max}$, the central positions of the sub-wavelength structure bodies are varied so as to be larger than $\Delta Tp_{max}$ in the inter-line direction.

(16) The optical system set forth in (13) or (14), wherein the line is wobbled.

(17) The optical system set forth in (16), wherein at least one of the period or the amplitude of the wobble of the line is irregular.

(18) The optical system set forth in (13) or (14), wherein the central positions of the sub-wavelength structure bodies are varied independently with respect to each other in the inter-line direction.

(19) The optical system set forth in (13) or (14), wherein the sub-wavelength structure bodies which are adjacent in the line direction form a block, and wherein the central positions of the sub-wavelength structure bodies are varied in the inter-line direction with the block units.

(20) The optical system set forth in any one of (13) to (19) further including an imaging device that senses light via the optical element.

(21) An optical system including one or two or more optical elements having a surface on which a plurality of sub-wavelength structure bodies are formed, wherein the optical element includes a base having a surface; and a plurality of sub-wavelength structure bodies formed on the surface of the base, and wherein a disposition pitch P of the sub-wavelength structure bodies in the same line is varied with respect to an average disposition pitch Pm.

(22) The optical system set forth in (21), wherein the variation is irregular.

(23) The optical element set forth in (21) or (22), wherein if a maximum value of the variation widths of inter-line pitches is $\Delta Tp_{max}$, a variation width $\Delta P$ of the disposition pitch P with respect to the average disposition pitch Pm is varied so as to be larger than $\Delta Tp_{max}$.

(24) The optical system set forth in (21) or (22), wherein the disposition pitches P of the sub-wavelength structure bodies are varied independently with respect to each other in the line direction.

(25) The optical system set forth in (21) or (22), wherein the sub-wavelength structure bodies which are adjacent in the line direction form a block, and wherein the disposition pitch P of the sub-wavelength structure bodies is varied in the line direction with the block units.

(26) The optical system set forth in any one of (21) to (25) further including an imaging device that senses light via the optical element.

(27) An imaging apparatus including the optical system set forth in any one of (13) to (26).

(28) An optical instrument including the optical system set forth in any one of (13) to (26).

(29) A stamper having a surface on which a plurality of sub-wavelength structure bodies are formed, wherein the plurality of sub-wavelength structure bodies form a plurality of lines, and wherein central positions of the sub-wavelength structure bodies are varied in an inter-line direction.

(30) The stamper set forth in (29), wherein the variation is irregular.

(31) The stamper set forth in (29) or (30), wherein if a maximum value of the variation widths $\Delta Tp$ of inter-line pitches is $\Delta Tp_{max}$, the central positions of the sub-wavelength structure bodies are varied so as to be larger than $\Delta Tp_{max}$ in the inter-line direction.

(32) The stamper set forth in (29) or (30), wherein the line is wobbled.

(33) The stamper set forth in (32), wherein at least one of the period or the amplitude of the wobble of the line is irregular.

(34) The stamper set forth in (29) or (30), wherein the central positions of the sub-wavelength structure bodies are varied independently with respect to each other in the inter-line direction.

(35) The stamper set forth in (29) or (30), wherein the sub-wavelength structure bodies which are adjacent in the line direction form a block, and wherein the central positions of the sub-wavelength structure bodies are varied in the inter-line direction with the block units.

(36) A stamper having a surface on which a plurality of sub-wavelength structure bodies are formed, wherein the plurality of sub-wavelength structure bodies form a plurality of lines, and wherein a disposition pitch P of the sub-wavelength structure bodies in the same line is varied with respect to an average disposition pitch Pm.

(37) The stamper set forth in (36), wherein the variation is irregular.

(38) The stamper set forth in (36) or (37), wherein if a maximum value of the variation widths of inter-line pitches is $\Delta Tp_{max}$, a variation width $\Delta P$ of the disposition pitch P with respect to the average disposition pitch Pm is varied so as to be larger than $\Delta Tp_{max}$.

(39) The stamper set forth in (36) or (37), wherein the disposition pitches P of the sub-wavelength structure bodies are varied independently with respect to each other in the line direction.

(40) The stamper set forth in (36) or (37), wherein the sub-wavelength structure bodies which are adjacent in the line direction form a block, and wherein the disposition pitch P of the sub-wavelength structure bodies is varied in the line direction with the block units.

EXAMPLES

Although the present disclosure will be described using Examples, the present disclosure is not limited to such Examples.

Relationship Between Track Pitch And Scattered Light

A relationship between the track pitch and the scattered light was examined through the RCWA (Rigorous Coupled Wave Analysis) simulation.

Test Example 1-1

Assuming an optical element having a plurality of sub-wavelength structure bodies on a surface thereof, an intensity distribution of scattered light was obtained through the simulation in a case where light was applied to the optical element from a dot light source.

Simulation conditions were as follows.
Sub-wavelength structure body arrangement: square grid
Track direction disposition pitch P1: 250 nm
Track pitch Tp: 200 nm
Bottom surface shape of sub-wavelength structure body: elliptical shape
Height of sub-wavelength structure body: 200 nm
Structure body shape: parabolic shape (bell shape)
Polarization: no polarization
Refractive index: 1.5

Test Example 1-2

Test Example 1-2 was the same as Test Example 1-1 except that the track pitch Tp was 250 nm, and intensity distribution of scattered light was obtained through the simulation.

Figure 18A:
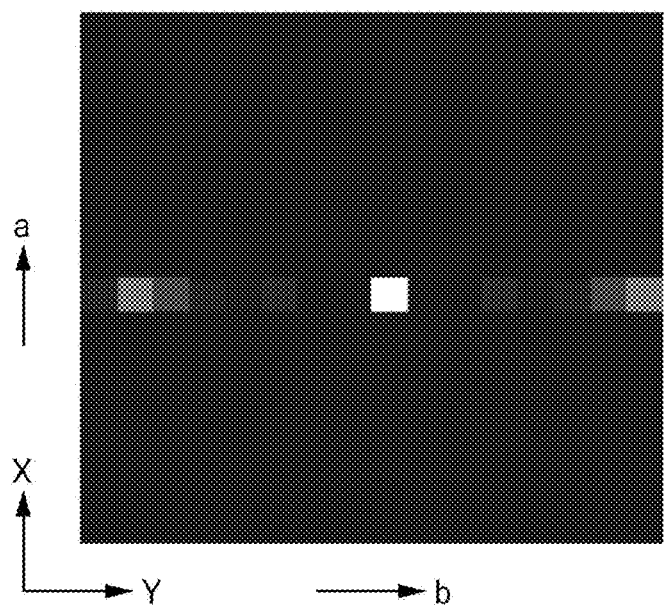
FIG. 18A is a diagram illustrating a simulation result of Test Example 1-1.
Figure 18B:
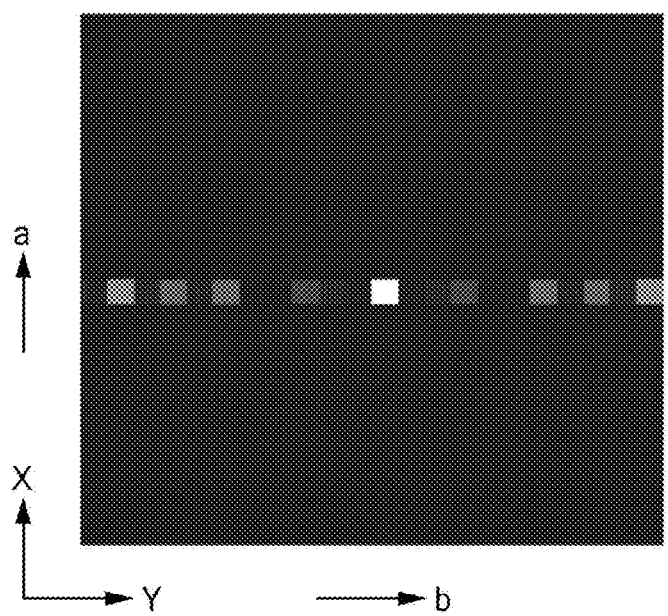
FIG. 18B is a diagram illustrating a simulation result of Test Example 1-2.

FIG. 18A is a diagram illustrating a simulation result of Test Example 1-1. FIG. 18B is a diagram illustrating a simulation result of Test Example 1-2. In FIGS. 18A and 18B, intensity distribution of the scattered light in a range of longitudinal and transverse axes (XY axes): NA=±1.5 is shown, and positions having high intensity are displayed to be bright (white). The parts having high intensity of the scattered light shown in the centers (optical axis parts) of FIGS. 18A and 18B show intensity of incident light (zero-order light).

The following could be seen from the above-described simulation results.

In Test Example 1-1, the scattered light becomes distant from the optical axis, and thus in the optical element assumed in Test Example 1-1, the intensity of the scattered light tends to be decreased in a range of NA<0.8 as compared with the optical element assumed in Test Example 1-2. Therefore, in the optical element of Test Example 1-1, image noise (bright line noise) in a captured image can be reduced.

In Test Example 1-2, the scattered light is present around the optical axis, and thus the intensity of the scattered light tends to be increased in a range of NA<0.8. Therefore, in the optical element of Test Example 1-2, image noise (bright line noise) occurs in a captured image.

As above, from the viewpoint of reduction in occurrence of the image noise, the track pitch (disposition pitch in the inter-track direction) Tp is preferably small.

Relationship Between Track Pitch Variation Amount And Scattered Light

A relationship between a variation amount of the track pitch, an arrangement form of the sub-wavelength structure bodies, and the scattered light was examined through the RCWA (Rigorous Coupled Wave Analysis) simulation.

Test Example 2-1

Assuming an optical element having a plurality of sub-wavelength structure bodies on a surface thereof, an intensity distribution of scattered light was obtained through simulation in a case where light was applied to the optical element from a dot light source.
Simulation conditions were as follows.
Sub-wavelength structure body arrangement: square grid
Track direction disposition pitch P1: 250 nm
Center value of track pitch Tp: 250 nm
Maximum value of track pitch Tp variation amounts: 32 nm
Bottom surface shape of sub-wavelength structure body: elliptical shape
Height of sub-wavelength structure body: 200 nm
Structure body shape: parabolic shape (bell shape)
Polarization: no polarization
Refractive index: 1.5

Test Example 2-2

Test Example 2-2 was the same as Test Example 2-1 except that the maximum value of the track pitch Tp variation amounts was $\Delta Tp=8$ nm, and intensity distribution of scattered light was obtained through simulation.

Test Example 2-3

Test Example 2-3 was the same as Test Example 2-1 except that the maximum value of the track pitch Tp variation amounts was $\Delta Tp=8$ nm, and the tracks were wobbled, and intensity distribution of scattered light was obtained through simulation.

Figure 19A:
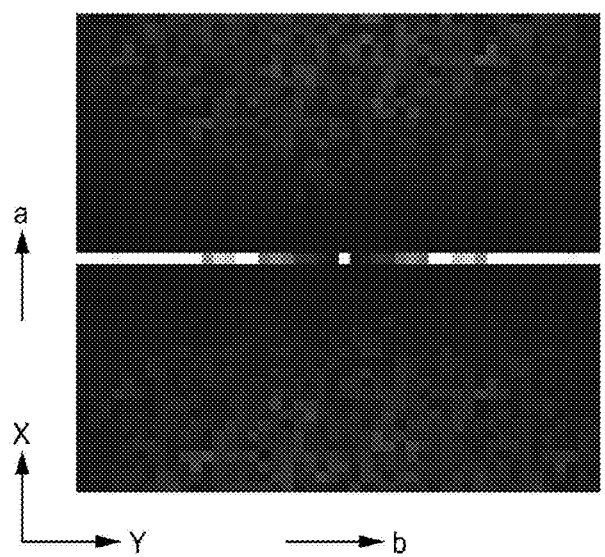
FIG. 19A is a diagram illustrating a simulation result of Test Example 2-1.
Figure 19B:
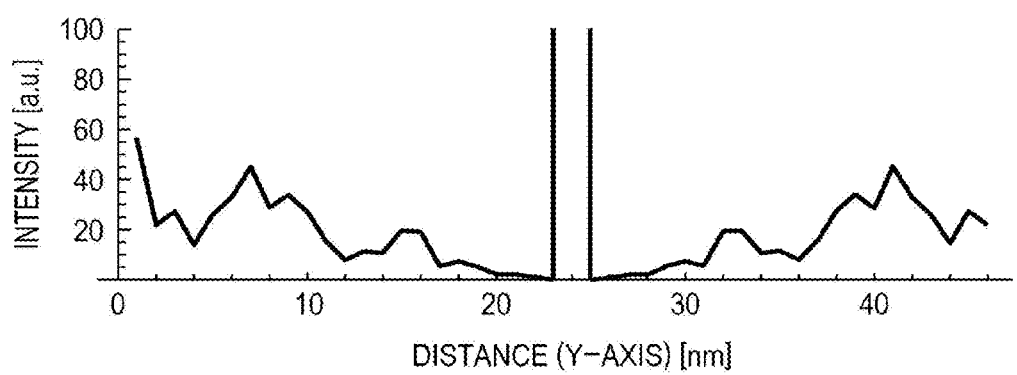
FIG. 19B is a graph illustrating an intensity distribution which is the simulation result of Test Example 2-1.
Figure 20A:
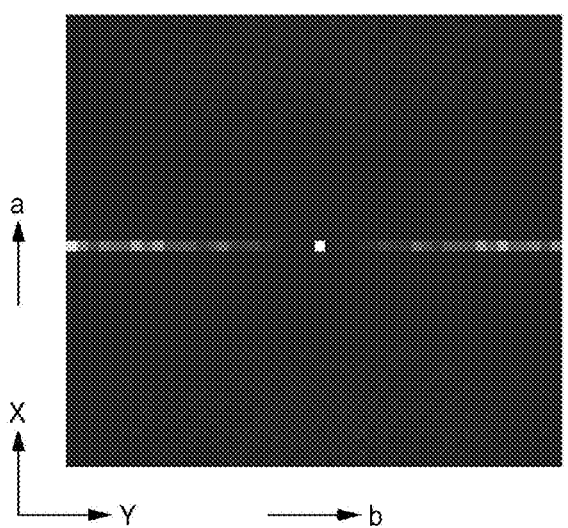
FIG. 20A is a diagram illustrating a simulation result of Test Example 2-2.
Figure 20B:
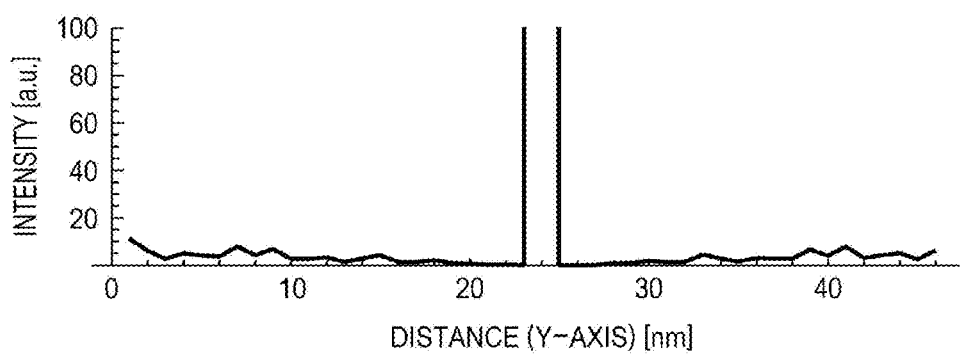
FIG. 20B is a graph illustrating an intensity distribution which is the simulation result of Test Example 2-2.
Figure 21A:
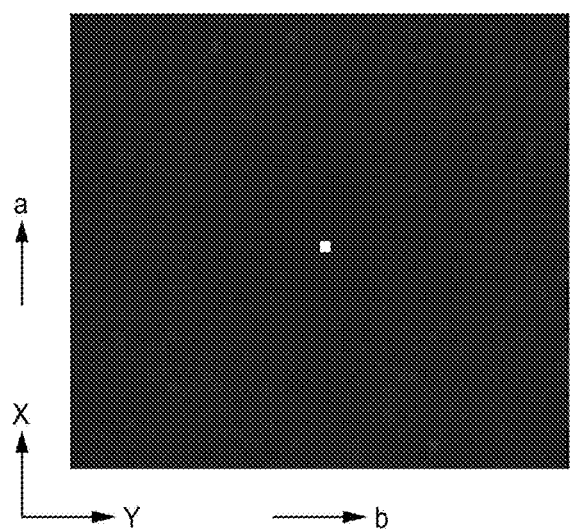
FIG. 21A is a diagram illustrating a simulation result of Test Example 2-3.
Figure 21B:
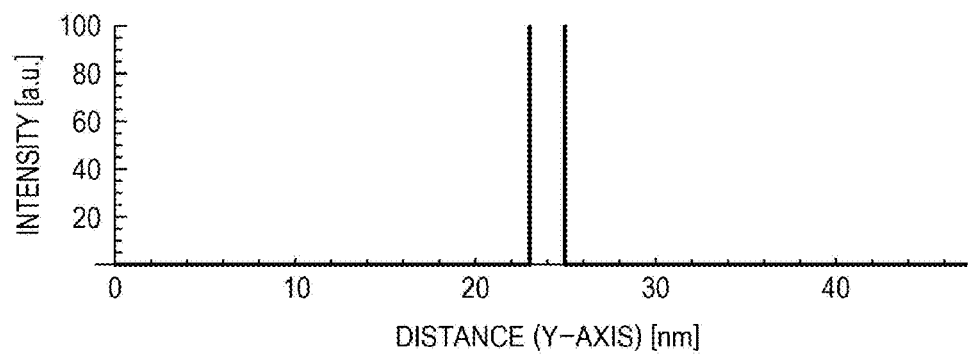
FIG. 21B is a graph illustrating an intensity distribution which is the simulation result of Test Example 2-3.

FIGS. 19A and 19B are diagrams illustrating simulation results of Test Example 2-1. FIGS. 20A and 20B are diagrams illustrating simulation results of Test Example 2-2. FIGS. 21A and 21B are diagrams illustrating simulation results of Test Example 2-3. In FIGS. 19A, 20A and 21A, intensity distribution of the scattered light in a range of longitudinal and transverse axes (XY axes): NA=±1.5 is shown, and positions having high intensity are displayed to be bright (white). The parts having high intensity of the scattered light shown in the centers (optical axis parts) of FIGS. 19A, 20A and 21A show intensity of incident light (zero-order light). In addition, a haze value in Test Example 2-1 is close to a haze value (a haze value corresponding to moth-eye) obtained through actual measurement, and thus the models assumed in the simulations of Test Examples 2-1 to 2-3 can be judged to be appropriate.

In relation to Test Examples 2-1 to 2-3, a ratio ((ILb/ILa)×100%) of a sum ILb of a light amount of strip-shaped scattered light to a sum ILa of a light amount of incident light is shown below.

Test Example 2-1:0.2% (a ratio (Ib/Ia) of a sum Ib of intensities of scattered light to a sum Ia of intensities of incident light: 1/500)

Test Example 2-2:0.02% (a ratio (Ib/Ia) of a sum Ib of intensities of scattered light to a sum Ia of intensities of incident light: 1/5000)

Test Example 2-3:0.001% (a ratio (Ib/Ia) of a sum Ib of intensities of scattered light to a sum Ia of intensities of incident light: $1/10^5$)

The following could be seen from the above-described simulation results.

It could be seen from the simulation result of Test Example 2-1 that if the maximum value of the variation amounts $\Delta Tp$ of the track pitches Tp was large, the bright line noise occurred.

It could be seen from the simulation result of Test Example 2-2 that if the maximum value of the variation amounts $\Delta Tp$ of the track pitches Tp was small, the bright line noise could be suppressed from occurring, and thus an effect of suppressing occurrence of the bright line noise could be achieved by controlling a variation amount of the track pitch with high accuracy.

It could be seen from the simulation result of Test Example 2-3 that if the maximum value of the variation amounts $\Delta Tp$ of the track pitch Tp was small and the tracks were varied through wobbling at a nonperiodic frequency, occurrence of the bright line noise could be further suppressed.

From the viewpoint of suppression of occurrence of the bright line noise, a ratio of the intensities of the scattered light to intensities of incident light is in a range preferably less than 1/500, more preferably equal to or less than 1/5000, and, most preferably, equal to or less than $1/10^5$.

As above, although the embodiments of the present disclosure have been described in detail, the present disclosure is not limited to the above-described embodiments but may have various modifications based on the technical sprit of the present disclosure.

For example, the optical element according to the embodiments of the present disclosure is applicable to not only an imaging apparatus but also a microscope or an exposure device.

In addition, for example, the configurations, the methods, the processes, the shapes, the materials, the numerical values, and the like which have been described in the embodiments are only an example, and configurations, methods, processes, shapes, materials, and numerical values different therefrom may be used as necessary.

Further, the configurations, the methods, the processes, the shapes, the materials, the numerical values, and the like which have been described in the embodiments may be combined with each other within the scope without departing from the spirit of the present disclosure.

Although an example where the present disclosure is applied to the imaging apparatus has been described in the above-described embodiments, the present disclosure is not limited to the example, and the present disclosure is applicable to an optical system having an optical element of which a surface (at least one of an incidence surface or an exit surface) is provided with a plurality of sub-wavelength structure bodies, or an optical apparatus having the same. For example, the present disclosure is applicable to a microscope and an exposure device, or the like.

Further, although an example where the present disclosure is applied to the digital imaging apparatus has been described, the present disclosure is applicable to an analog imaging apparatus.

It should be understood that various changes and modifications to the presently preferred embodiments described herein will be apparent to those skilled in the art. Such changes and modifications can be made without departing from the spirit and scope of the present subject matter and The invention is claimed as follows:

1. An optical system, comprising:
   an optical element that has a surface, wherein the surface includes a plurality of sub-wavelength structure bodies,
   wherein the plurality of sub-wavelength structure bodies comprise a plurality of lines of tracks, wherein the plurality of lines of tracks are on or above the surface of the optical element,
   wherein a first pitch Tp between the plurality of lines of tracks varies in an inter-track direction,
   wherein a second pitch P between central positions of adjacent sub-wavelength structure bodies varies in a direction perpendicular to the inter-track direction, and
   wherein a variation width $\Delta P$ obtained by the variation of the second pitch P is larger than $\Delta Tp_{max}$, where $\Delta Tp_{max}$ is a maximum value of a plurality of variation widths $\Delta Tp$ obtained by variation of the first pitch Tp.

2. The optical system according to claim 1, further comprising:
   an imaging device including an image region which senses light via the optical element,
   wherein the surface of the optical element comprises at least one section that scatter incident light and generate scattered light, and
   wherein an intensity distribution of the scattered light has anisotropy.

3. The optical system according to claim 2, wherein the intensity distribution of the scattered light is different depending on numerical aperture NA.

4. The optical system according to claim 3, wherein an intensity per unit solid angle of the intensity distribution of the scattered light is smaller in a range of the numerical aperture NA≤0.8 than in the numerical aperture NA>0.8.

5. The optical system according to claim 2, wherein a maximum value of intensity distribution of the scattered light in the imaging region is smaller than a maximum value of intensity distribution of the scattered light in a region outside the imaging region.

6. The optical system according to claim 1, wherein a distance between central positions of two of the plurality of sub-wavelength structure bodies in one line of track of the plurality of lines of tracks varies as compared with a reference pitch.

7. The optical system according to claim 1, wherein a shape of the plurality of lines of tracks is one of a linear shape or an arc shape.

8. The optical system according to claim 1,
   wherein the plurality of sub-wavelength structure bodies form a grid pattern, and
   wherein the grid pattern is at least one of a hexagonal grid pattern, a quasi-hexagonal grid pattern, a square pattern, or a quasi-square pattern.

9. The optical system according to claim 1, further comprising:
   an imaging device that has an imaging region, wherein the imaging region is configured to sense light via the optical element,
   wherein the imaging region has a rectangular shape that has two sets of sides, and
   wherein a direction of the plurality of lines of tracks is parallel to an extending direction of one set of sides of the two sets of sides.

10. The optical system according to claim 9,
    wherein the two sets of sides include a set of short sides and a set of long sides, and
    wherein the direction of the plurality of lines of tracks is parallel to an extending direction of the set of long sides.

11. The optical system according to claim 10,
    wherein each sub-wavelength structure body of the plurality of sub-wavelength structure bodies is a cone which has a bottom surface of an elliptical shape, wherein the elliptical shape has a long axis and a short axis, and
    wherein a direction of the long axis of the bottom surface corresponds with the direction of the plurality of lines of tracks.

12. The optical system according to claim 9,
    wherein the surface of the optical element has one or more sections, wherein the one or more sections are configured to scatter incident light and generate scattered light.

13. The optical system according to claim 12, wherein a sum total of components of the scattered light that reaches the imaging region is smaller than a sum total of components that reaches regions different from the imaging region.

14. The optical system according to claim 1, wherein central positions of the plurality of sub-wavelength structure bodies vary in the inter-track direction at a distance equal to a non-zero natural number with respect to a track direction.

15. The optical system according to claim 6,
    wherein the reference pitch is an average of distances between central positions of the plurality of sub-wavelength structure bodies in the one line of track of the plurality of lines of tracks.

16. The optical system according to claim 1,
    wherein a reference pitch is calculated based on the second pitch and a third pitch, where the third pitch is measured in an inclined direction with respect to the one line of track of the plurality of lines of tracks.

17. An imaging apparatus, comprising:
    an optical element that has a surface, wherein the surface includes a plurality of sub-wavelength structure bodies,
    wherein the plurality of sub-wavelength structure bodies comprise a plurality of lines of tracks, wherein the plurality of lines of tracks are on or above the surface of the optical element,
    wherein a first pitch Tp between the plurality of lines of tracks varies in an inter-track direction,
    wherein a second pitch P between central positions of adjacent sub-wavelength structure bodies varies in a direction perpendicular to the inter-track direction, and
    wherein a variation width $\Delta P$ obtained by the variation of the second pitch P is larder than $\Delta Tp_{max}$, where $\Delta Tp_{max}$ is a maximum value of a plurality of variation widths $\Delta Tp$ obtained by variation of the first pitch Tp.

18. An optical instrument, comprising:
    an optical element that has a surface, wherein the surface includes a plurality of sub-wavelength structure bodies,
    wherein the plurality of sub-wavelength structure bodies comprise a plurality of lines of tracks, wherein the plurality of lines of tracks are on or above the surface of the optical element,
    wherein a first pitch Tp between the plurality of lines of tracks varies in an inter-track direction,
    wherein a second pitch P between central positions of adjacent sub-wavelength structure bodies varies in a direction perpendicular to the inter-track direction, and wherein a variation width ΔP obtained by the variation of the second pitch P is larger than $\Delta Tp_{max}$, where $\Delta Tp_{max}$ is a maximum value of a plurality of variation widths ΔTp obtained by variation of the first pitch Tp.

19. An optical element, comprising:
a plurality of sub-wavelength structure bodies on a surface of the optical element,
wherein the plurality of sub-wavelength structure bodies are arranged in a grid pattern,
wherein the plurality of sub-wavelength structure bodies comprise a plurality of lines of tracks, wherein the plurality of lines of tracks are on or above the surface,
wherein a first pitch Tp between the plurality of lines of tracks varies in an inter-track direction,
wherein a second pitch P between central positions of adjacent sub-wavelength structure bodies varies in a direction perpendicular to the inter-track direction, and
wherein a variation width ΔP obtained by the variation of the second pitch P is larger than $\Delta Tp_{max}$, where $\Delta Tp_{max}$ is a maximum value of a plurality of variation widths ΔTp obtained by variation of the first pitch Tp.

20. The optical element according to claim 19, wherein the grid pattern is at least one of a hexagonal grid pattern, a quasi-hexagonal grid pattern, a square pattern, or a quasi-square pattern.

21. The optical element according to claim 19, wherein central positions of the plurality of sub-wavelength structure bodies vary in the inter-track direction at a distance equal to a non-zero natural number with respect to a track direction.

* * * * *